(12) United States Patent
Rivard

(10) Patent No.: US 10,438,083 B1
(45) Date of Patent: Oct. 8, 2019

(54) METHOD AND SYSTEM FOR PROCESSING CANDIDATE STRINGS GENERATED BY AN OPTICAL CHARACTER RECOGNITION PROCESS

(71) Applicant: Matrox Electronic Systems Ltd., Dorval (CA)

(72) Inventor: Dominique Rivard, Pierrefonds (CA)

(73) Assignee: MATROX ELECTRONIC SYSTEMS LTD., Dorval, Quebec (CA)

( * ) Notice: Subject to any disclaimer, the term of this patent is extended or adjusted under 35 U.S.C. 154(b) by 0 days.

(21) Appl. No.: 15/385,506

(22) Filed: Dec. 20, 2016

Related U.S. Application Data

(60) Provisional application No. 62/400,602, filed on Sep. 27, 2016.

(51) Int. Cl.
*G06K 9/34* (2006.01)
*G06K 9/78* (2006.01)

(52) U.S. Cl.
CPC .............. *G06K 9/344* (2013.01); *G06K 9/78* (2013.01); *G06K 2209/01* (2013.01)

(58) Field of Classification Search
CPC ....... G06K 9/344; G06K 9/78; G06K 2209/01
See application file for complete search history.

(56) References Cited

U.S. PATENT DOCUMENTS

| | | | |
|---|---|---|---|
| 5,689,585 A | 11/1997 | Bloomberg et al. | |
| 6,668,085 B1 | 12/2003 | Evans | |
| 9,727,804 B1 | 8/2017 | Lapointe | |
| 2003/0028522 A1* | 2/2003 | Collins-Thompson | ..................... G06F 17/2715 |
| 2005/0123203 A1 | 6/2005 | Heilper et al. | |
| 2007/0013967 A1* | 1/2007 | Ebaugh | ............. G06F 17/30613 358/448 |
| 2007/0053611 A1 | 3/2007 | Wnek | |

(Continued)

OTHER PUBLICATIONS

Kumar et al. ("Keyword Spotting Framework using Dynamic Background Model," IEEE International Conference on Frontiers in Handwriting Recognition, Sep. 18-20, 2012) (Year: 2012).*

(Continued)

*Primary Examiner* — Yubin Hung
(74) *Attorney, Agent, or Firm* — Anglehart et al.

(57) ABSTRACT

A method and system of recognizing a string of characters in a target image. An acquired target image is analyzed using an optical character recognition process to identify a candidate string, the candidate string having an associated plurality of character positions, each character position being associated with a set of one or more candidate characters located at related positions in the target image. A minimum edit cost is determined between the candidate string and a template for an output string. Determining the minimum edit cost includes, for a given character position in the candidate string and a given output character position in the template, identifying, among the respective set of candidate characters of the candidate string, a subset of candidate characters that satisfy the respective character set of the template; and determining an edit cost based on the recognition score of one of the candidate characters belonging to the identified subset of candidate characters. An output string corresponding to the determined minimum edit cost is returned.

55 Claims, 27 Drawing Sheets

(56) References Cited

U.S. PATENT DOCUMENTS

| | | | |
|---|---|---|---|
| 2010/0241649 A1* | 9/2010 | Lewak | G06F 17/30997 707/767 |
| 2011/0016363 A1* | 1/2011 | Washio | H04M 3/36 714/57 |
| 2012/0070073 A1* | 3/2012 | Kompalli | G06K 9/00852 382/159 |
| 2012/0323901 A1* | 12/2012 | Masuko | G06F 17/30253 707/723 |
| 2013/0108160 A1* | 5/2013 | Yamazoe | G06K 9/723 382/177 |
| 2016/0019430 A1* | 1/2016 | Stella | G06T 7/10 382/310 |

OTHER PUBLICATIONS

Zhou et al. ("Handwritten Chinese/Japanese Text Recognition Using Semi-Markov Conditional Random Fields," IEEE Transactions on Pattern Analysis and Machine Intelligence, vol. 35, Iss. 10, Oct. 2013) (Year: 2013).*

Wen et al. ("An Algorithm for License Plate Recognition Applied to Intelligent Transportation System," IEEE Transactions on Intelligent Transportation Systems,vol. 12, Iss. 3, Sep. 2011) (Year: 2011).*

Yoshida et al. ("Keywords Recognition of Handwritten Character String on Whiteboard Using Word Dictionary for e-Learning," IEEE International Conference on Hybrid Information Technology, vol. 1, Nov. 9-11, 2006) (Year: 2006).*

Nomura et al., "A Novel Adaptive Morphological Approach for Degraded Character Image Segmentation"; Nov. 2005, vol. 38, Issue 11, pp. 1961-1975. Abstract.

Zheng, Lihong; Hel, Xiangjian and Le, Yuanzong; "A Comparison of Methods for Character Recognition of Car Number Plates"; Jan. 2005; Proceedings of the 2005 International Conference on Computer Vision, 2005, pp. 33-39.

LingPipe: String Comparison and String Distance Tutorial, Printed Aug. 17, 2016.

Oliveira Neto, Francisco Moraes, "Matching Vehicle License Plate Nos. Using License Plate Recognition and Text Mining Techniques. " PhD diss., University of Tennessee, 2010.

Online license plate matching procedures using license-plate recognition machines and new weighted edit distance, Francisco Moraes Oliveira-Neto, Lee D. Han, Myong K. Jeong, Transportation Research Part C 21 (2012) 306-320.

Weighted Edit Distance, Yufeng Wu, Associate Professor, Computer Science and Engineering Department, University of Connecticut, Date not available.

* cited by examiner

| Candidate character (match) Mj | Position Xj | Matched character model MCMj | Score Sj | Label Lj |
|---|---|---|---|---|
| M1 | X1 | CM28 | 0.88 | 1 |
| M2 | X2 | CM2 | 0.91 | B |
| M3 | X3 | CM35 | 0.88 | 8 |
| M4 | X4 | CM1 | 0.75 | A |
| M5 | X5 | CM19 | 0.98 | S |
| M6 | X6 | CM32 | 0.97 | 5 |
| M7 | X7 | CM13 | 0.92 | M |
| M8 | X8 | CM28 | 0.96 | 1 |
| M9 | X9 | CM31 | 0.94 | 4 |
| M10 | X10 | CM28 | 0.96 | 1 |
| M11 | X11 | CM28 | 0.92 | 1 |

Figure 6

| Rank | Candidate character (match) Mj | Score Sj | Label Lj | Primary candidate character? | Higher-ranked candidate character(s) |
|---|---|---|---|---|---|
| R1 | M5 | 0.98 | S | Yes | N/A |
| R2 | M6 | 0.97 | 5 | No | R1(M5) Level 0 |
| R3 | M8 | 0.96 | 1 | Yes | N/A |
| R4 | M10 | 0.96 | 1 | Yes | N/A |
| R5 | M9 | 0.94 | 4 | Yes | N/A |
| R6 | M7 | 0.92 | M | No | R3(M8) Level 0, R5(M9) Level 0 |
| R7 | M11 | 0.92 | 1 | Yes | N/A |
| R8 | M2 | 0.91 | B | Yes | N/A |
| R9 | M1 | 0.88 | 1 | Yes | N/A |
| R10 | M3 | 0.88 | 8 | No | R8(M2) Level 0 |
| R11 | M4 | 0.75 | A | No | R8(M2) Level 0, R10(M3) Level 1 |

Figure 9

| Rank | Candidate character (match) Mj | Score Sj | Label Lj | Associated secondary candidate character |
|---|---|---|---|---|
| R1 | M5 | 0.98 | S | R2(M6) |
| R3 | M8 | 0.96 | 1 | None* |
| R4 | M10 | 0.96 | 1 | None |
| R5 | M9 | 0.94 | 4 | None** |
| R7 | M11 | 0.92 | 1 | None |
| R8 | M2 | 0.91 | B | R10(M3), R11(M4) |
| R9 | M1 | 0.88 | 1 | None |

*R6(M7) is not exclusive to R3(M8)

**R6(M7) is not exclusive to R5(M9)

Figure 12

| Position in candidate string | Candidate character (match) Mj | Position Xj | Score Sj | Label Lj | Associated secondary candidate character(s) |
|---|---|---|---|---|---|
| 1 | M1 | X1 | 0.88 | 1 | |
| 2 | M2 | X2 | 0.91 | B | R10(M3), R11(M4) |
| 3 | M5 | X5 | 0.98 | S | R2(M6) |
| 4 | M8 | X8 | 0.96 | 1 | |
| 5 | M9 | X9 | 0.94 | 4 | |

Note: M11 does not satisfy the alignment criterion. M10 does not satisfy the inter-character spacing criterion.

Figure 14

| Candidate string CS | | Edit cost D(i,j) | Template T | | | | | |
|---|---|---|---|---|---|---|---|---|
| | | Character set Cj | C1 | C2 | ... | CM | |
| | | Output character position j | 1 | 2 | ... | M | |
| Set of candidate characters CCi | Character position i | D(0, 0) | | | | | |
| CC1 | 1 | | D(i-1, j-1) | D(i-1, j) | | | |
| CC2 | 2 | | D(i, j-1) | D(i, j) | | | |
| ... | ... | | | | | | |
| CCN | N | | | | | D(N, M) | |

Figure 17A

| Template T | | | | | | | |
|---|---|---|---|---|---|---|---|
| Character set Cj | | C1 | C2 | ... | CLmin | CLmin+1 | ... | CLmax |
| Output character position j | 0 | 1 | 2 | ... | Lmin | Lmin+1 | ... | Lmax |

| Candidate string CS | Edit cost D(i,j) | | | | | | | |
|---|---|---|---|---|---|---|---|---|
| Set of candidate characters CCi | Character position i | | | | | | | |
| CC1 | 1 | | | | | | | |
| CC2 | 2 | D(i,1-1) | D(i-1,j) | | | | | |
| ... | ... | D(i,i-1) | D(i,j) | | | | | |
| CCN | N | | | | D(N, Lmin) | D(N, Lmin+1) | | D(N, Lmax) |

Figure 17B

|  |  |  | Template |  |  |  |  |
|---|---|---|---|---|---|---|---|
|  |  | Edit cost D(i,j) | Character set | 1 | A, B | 0-9 | A-Z |
| Candidate string |  | Character position j | | 1 | 2 | 3 | 4 |
| Primary | Secondary | Character position i | 0 | n/a | n/a | n/a | n/a |
| M1 |  | 1 | 0.88 | 0.12 | n/a | n/a | n/a |
| M2 | M3, M4 | 2 | 1.79 | 1.03 | 0.21 | n/a | n/a |
| M5 | M6 | 3 | 2.77 | 2.01 | 1.19 | 0.24 | n/a |
| M8 |  | 4 | 3.73 | 2.81 | 2.15 |  |  |
| M9 |  | 5 | 4.67 | 3.75 | 3.09 |  |  |

| Candidate characters | | |
|---|---|---|
| Mj | Score Sj | Label Lj |
| M1 | 0.88 | 1 |
| M2 | 0.91 | B |
| M3 | 0.88 | 8 |
| M4 | 0.75 | A |
| M5 | 0.98 | S |
| M6 | 0.97 | 5 |
| M7 | 0.92 | M |
| M8 | 0.96 | 1 |
| M9 | 0.94 | 4 |
| M10 | 0.96 | 1 |
| M11 | 0.92 | 1 |

Figure 18

| Edit cost D(i,j) | | | Template | | | | |
|---|---|---|---|---|---|---|---|
| | | | Character set | 1 | A, B | 0-9 | A-Z |
| Candidate string | | | Character position j | 1 | 2 | 3 | 4 |
| Primary | Secondary | Character position i | 0 | n/a | n/a | n/a | n/a |
| M1 | | 1 | 0.88 | 0.12 | n/a | n/a | n/a |
| M2 | M3, M4 | 2 | 1.79 | 1.03 | 0.21 | n/a | n/a |
| M6 | | 3 | 2.77 | 2.01 | 1.19 | 0.24 | n/a |
| M8 | | 4 | 3.73 | 2.81 | 2.15 | 1.20 | |
| M9 | | 5 | 4.67 | 3.75 | 3.09 | | |

| Candidate characters | | |
|---|---|---|
| Mj | Score Sj | Label Lj |
| M1 | 0.88 | 1 |
| M2 | 0.91 | B |
| M3 | 0.88 | 8 |
| M4 | 0.75 | A |
| M5 | 0.98 | S |
| M6 | 0.97 | 5 |
| M7 | 0.92 | M |
| M8 | 0.96 | 1 |
| M9 | 0.94 | 4 |
| M10 | 0.96 | 1 |
| M11 | 0.92 | 1 |

Figure 19

| Edit cost D(i,j) | | | Template | | | | |
|---|---|---|---|---|---|---|---|
| | | | Character set | 1 | A, B | 0-9 | A-Z |
| Candidate string | | | Character position j | 1 | 2 | 3 | 4 |
| Primary | Secondary | Character position i | 0 | n/a | n/a | n/a | n/a |
| M1 | | 1 | 0.88 | 0.12 | n/a | n/a | n/a |
| M2 | M3, M4 | 2 | 1.79 | 1.03 | 0.21 | n/a | n/a |
| M6 | | 3 | 2.77 | 2.01 | 1.19 | 0.24 | n/a |
| M8 | | 4 | 3.73 | 2.81 | 2.15 | 1.20 | n/a |
| M9 | M7 | 5 | 4.67 | 3.75 | 3.09 | 2.14 | 1.28 |

| Candidate characters | | |
|---|---|---|
| Mj | Score Sj | Label Lj |
| M1 | 0.88 | 1 |
| M2 | 0.91 | B |
| M3 | 0.88 | 8 |
| M4 | 0.75 | A |
| M5 | 0.98 | S |
| M6 | 0.97 | 5 |
| M7 | 0.92 | M |
| M8 | 0.96 | 1 |
| M9 | 0.94 | 4 |
| M10 | 0.96 | 1 |
| M11 | 0.92 | 1 |

Figure 21

| Template for output string: | Character position | 1 | 2 | 3 | 4 |
|---|---|---|---|---|---|
| | Character set | 1 | A, B | 0-9 | A-Z |
| | | | | | |
| Output string: | Character position | 1 | 2 | 3 | 4 |
| | Output character (label) | 1 | B | 5 | M |

Figure 23

METHOD AND SYSTEM FOR PROCESSING CANDIDATE STRINGS GENERATED BY AN OPTICAL CHARACTER RECOGNITION PROCESS

TECHNICAL FIELD

The present invention relates generally to the field of optical character recognition. More specifically, the present invention relates to the processing of candidate strings generated by an optical character recognition process.

BACKGROUND

Optical Character Recognition (OCR) generally refers to a machine or computer-implemented method for recognizing a string of characters appearing in an input image and returning a corresponding output string of characters (e.g. in machine-encoded text form). Generally, an OCR process includes the steps of acquiring an input image containing a string of characters to be recognized, recognizing individual characters in the input image as characters of an alphabet, and returning a corresponding output string of characters.

OCR has a wide range of applications including the recognition of vehicle license plate numbers (for use in automated traffic law enforcement, surveillance, access control, tolling, etc.), the recognition of serial numbers on parts in an automated manufacturing environment, the recognition of labels on packages for routing purposes, and various document analysis applications.

Despite sophisticated OCR techniques, OCR errors frequently occur due to the non-ideal conditions of image acquisition, the partial occlusion or degradation of the depicted characters, and especially the structural similarity between certain characters (e.g. Z and 2, O and D, 1 and I). For example, the recognition of vehicle license plate numbers must overcome lighting conditions that are both variable (according to the time of day, weather conditions, etc.) and non-uniform (e.g. due to shadows and specular reflection), perspective distortion, and partial occlusion or degradation of the characters (e.g. due to mud, wear of the paint, etc.)

To improve the overall performance of OCR systems, it is essential to include a post-processing stage, during which OCR errors are automatically detected and corrected.

A popular technique to automatically correct errors in words is "dictionary lookup": an incorrect word, that is, one that does not belong to a predefined "dictionary" of valid words, is replaced by the closest valid word in the dictionary. This is often achieved by selecting the dictionary word yielding the minimum "edit distance" with the incorrect word. The edit distance between two strings is the minimum number of edit operations (deletions, insertions, and substitutions) required to transform the first string into the second string. The edit distance has been generalized to an edit cost by assigning a weight to an edit operation according to the type of operation and/or the character(s) of the alphabet involved in the operation.

Methods of automatic string correction based on the dictionary lookup paradigm are useful in cases where valid input strings are those belonging to a limited dictionary of valid strings. However, they are inadequate to correct strings that are not of the word-type. There are an increasing number of OCR applications in which valid strings are not words but strings satisfying a "template" of some sort; such strings include vehicle license plate numbers, serial numbers, ID numbers, ZIP codes, etc.

One existing method of string correction based on a "template" involves the determination of a set of edit operations needed to be performed on a string read from an image in order to satisfy a predefined template. A minimum cost of performing edit operations on the string to satisfy the template (i.e. minimum edit distance from string to template) is first determined, after which the edit operations corresponding to this minimum cost are identified and then applied to the string to generate a corrected string that satisfies the template.

In the aforementioned dictionary lookup methods and template-based method, only limited information related to the OCR process is considered during the OCR post-processing stage. In particular, during the OCR process, many potential matches for model characters may have been identified in a particular region of the input image and recognition scores attributed to each potential match. However, only information relating to the selected match (e.g., the potential match having the highest recognition score) is considered during the OCR post-processing stage in determining the minimum edit cost. This limits the ability of such OCR post-processing methods to detect OCR errors and return a correct output string.

There thus exists a need in the industry for an improved method and system for processing candidate strings generated by an optical character recognition process.

SUMMARY

In accordance with a broad aspect, the present invention provides a method of recognizing a string of characters in a target image. The method includes acquiring a target image; analyzing the target image using an optical character recognition process to identify a candidate string, the candidate string having an associated plurality of character positions, each character position being associated with a set of one or more candidate characters located at related positions in the target image, at least one of the character positions being associated with a plurality of candidate characters, each candidate character having an associated recognition score; receiving a template for an output string, the template having an associated plurality of output character positions, each output character position being associated with a character set defining a set of allowable characters for a respective character position in the output string; determining a minimum edit cost between the candidate string and the template, the step of determining a minimum edit cost including, for a given character position in the candidate string and a given output character position in the template, identifying, among the respective set of candidate characters of the candidate string, a subset of candidate characters that satisfy the respective character set of the template, and determining an edit cost based on the recognition score of one of the candidate characters belonging to the identified subset of candidate characters; and returning an output string corresponding to the determined minimum edit cost.

In accordance with another broad aspect, the present invention provides a method of processing a candidate string. The method includes receiving a candidate string generated by an optical character recognition process, the candidate string having an associated plurality of character positions, each character position being associated with a set of one or more candidate characters located at related positions in the target image, at least one of the character positions being associated with a plurality of candidate characters, each candidate character having an associated recognition score; receiving a template for an output string, the template having an associated plurality of output character positions, each output character position being associated with a character set defining a set of allowable characters for a respective character position in the output string; determining a minimum edit cost between the candidate string and the template, the step of determining a minimum edit cost including, for a given character position in the candidate string and a given output character position in the template identifying, among the respective set of candidate characters of the candidate string, a subset of candidate characters that satisfy the respective character set of the template, and determining an edit cost based on the recognition score of one of the candidate characters belonging to the identified subset of candidate characters; and returning an output string corresponding to the determined minimum edit cost.

In accordance with another broad aspect, the present invention provides a computer readable medium encoded with instructions that when executed by at least one processor implement a method for recognizing a string of characters in a target image. The method includes acquiring a target image; analyzing the target image using an optical character recognition process to identify a candidate string, the candidate string having an associated plurality of character positions, each character position being associated with a set of one or more candidate characters located at related positions in the target image, at least one of the character positions being associated with a plurality of candidate characters, each candidate character having an associated recognition score; receiving a template for an output string, the template having an associated plurality of output character positions, each output character position being associated with a character set defining a set of allowable characters for a respective character position in the output string; determining a minimum edit cost between the candidate string and the template, the step of determining a minimum edit cost including, for a given character position in the candidate string and a given output character position in the template, identifying, among the respective set of candidate characters of the candidate string, a subset of candidate characters that satisfy the respective character set of the template, and determining an edit cost based on the recognition score of one of the candidate characters belonging to the identified subset of candidate characters; and returning an output string corresponding to the determined minimum edit cost.

In accordance with yet another broad embodiment, the present invention provides an image processing system for recognizing a string of characters in a target image. The image processing system comprises a camera for acquiring a target image and an image processor. The image processor analyzes the target image using an optical character recognition process to identify a candidate string, the candidate string having an associated plurality of character positions, each character position being associated with a set of one or more candidate characters located at related positions in the target image, at least one of the character positions being associated with a plurality of candidate characters, each candidate character having an associated recognition score; receives a template for an output string, the template having an associated plurality of output character positions, each output character position being associated with a character set defining a set of allowable characters for a respective character position in the output string; and determines a minimum edit cost between the candidate string and the template. To determine a minimum edit cost, the image processor determines a minimum edit cost, including, for a given character position in the candidate string and a given output character position in the template: identifying, among the respective set of candidate characters of the candidate string, a subset of candidate characters that satisfy the respective character set of the template; and determining an edit cost based on the recognition score of one of the candidate characters belonging to the identified subset of candidate characters. The image processor returns an output string corresponding to the determined minimum edit cost.

BRIEF DESCRIPTION OF THE DRAWINGS

The invention will be better understood by way of the following detailed description of embodiments of the invention with reference to the appended drawings, in which:

FIG. 6 is a table providing information related to the candidate characters identified in the exemplary target image of FIG. 5, according to a non-limiting example of implementation of the present invention;

FIGS. 8-11 illustrate the grouping into sets of the candidate characters identified in the exemplary target image of FIG. 5, according to non-limiting example of implementation of the present invention;

FIG. 12 is a table illustrating the hierarchical sets of candidate characters found in the target image of FIG. 5, according to a non-limiting example of implementation of the present invention;

FIGS. 14-15 illustrate an example of a candidate string read from the exemplary target image of FIG. 5, according to a non-limiting example of implementation of the present invention;

FIG. 17A illustrates a dynamic programming algorithm (DPA) array used in determining a minimum cost of performing edit operations on a candidate string to satisfy a template of fixed length, according to a broad embodiment of the present invention;

FIG. 17B illustrates a DPA array used in determining a minimum cost of performing edit operations on a candidate string to satisfy a template of variable length, according to a broad embodiment of the present invention;

FIGS. 18-22 illustrate an example of different steps of a dynamic programming algorithm for determining a minimum cost of performing edit operations on the candidate string of FIGS. 14-15 to satisfy a template for an output string, and the corresponding transformation of the candidate string, according to a non-limiting example of implementation of the present invention;

FIG. 23 illustrates the final transformation of the candidate string of FIGS. 14-15 into an output string satisfying the defined template, according to a non-limiting example of implementation of the present invention;

DETAILED DESCRIPTION

The present invention is directed to a novel method and system for dynamic string correction, the string read from an image that has been digitally acquired by any suitable device, such as a camera, a video camera, a scanner or a computer, among other possibilities.

The image that is acquired and that is to be analyzed for the presence of one or more strings may be an image from a physical scene, a printed material or a sequence of images (e.g. video images). Once such an image has been acquired, a computing unit such as a processor, an image processor, a dedicated hardware component or any other suitable computing unit may be adapted to receive the image and to apply optical character recognition techniques thereto to identify the presence of one or more strings of characters in the image, to read the strings and to correct the strings, if necessary.

Figure 1:
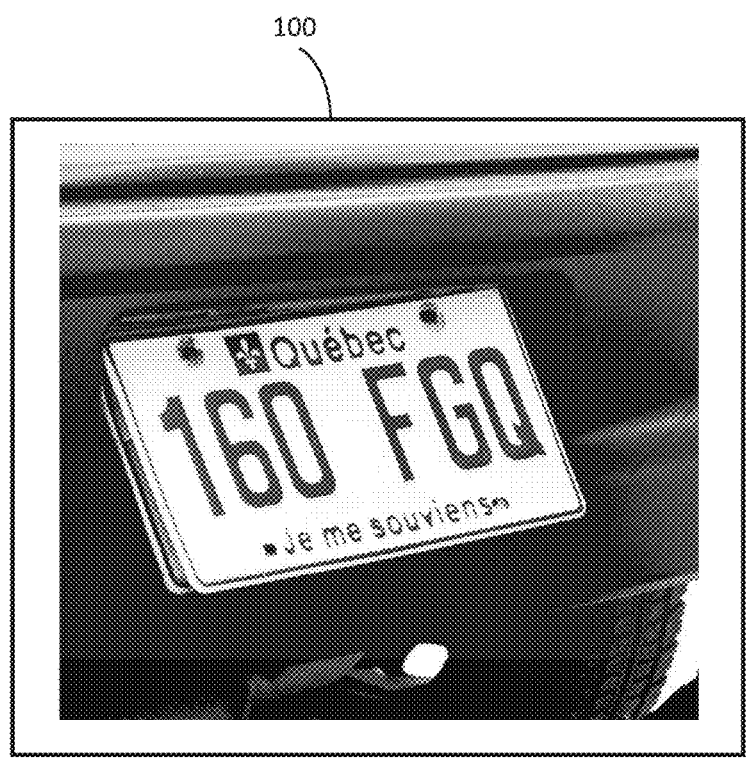
FIG. 1 illustrates an image of a vehicle license plate, to be analyzed for reading therefrom the license plate number.

FIG. 1 illustrates an example of an image 100 of a vehicle that was taken by a camera, showing a license plate attached to the back of the car. In a traffic law enforcement system, such an image 100 may be analysed to read therefrom the license plate number, for surveillance, fining or other purposes. Thus, a computing unit may receive the image 100 and process the image 100 to attempt to identify, recognize and auto-correct the license plate number contained therein. Once the license plate number has been read and, if necessary, corrected, further law enforcement analysis or processing may be pursued on the basis of this license plate number. Note that although the example of reading a license plate number from an image taken of a vehicle is presented herein for illustrative purposes, the reading and correction of a string found in an image may be required and implemented in a variety of different applications, all included within the scope of the present invention.

In the context of the present specification, a "portion" or "region" of an image may refer to a group of pixels, a line of pixels, a group of pixel lines, a partial area of the image or the entire image. Moreover, an image or a portion of the image may comprise a single object (such as in the non-limiting example of FIG. 1), a variety of different objects or a portion of one or more different objects, without departing from the scope of the present invention.

Note that the selection of a portion or portions of an image to be analysed for the presence of a string to be read may be effected manually by a user or operator, or automatically by an algorithm implemented by the computing unit, on a basis of various predefined conditions, such as for example a region of interest, an intensity level contrast or the type of application. Furthermore, any such algorithm may be configured to perform automatic portion selection on a basis of user-defined portion selection for a template image or on basis of pre-processing analysis of the image.

Thus, in a string recognition system, once an image is acquired and a portion (or the entirety) of this image is selected for analysis to identify therein a string to be read, a specific string recognition algorithm is applied by the computing unit to the selected portion, where this string recognition algorithm may include string correction. In a broad embodiment of the present invention, the string recognition algorithm includes using an optical character recognition process to identify a candidate string in the image and transforming the candidate string to satisfy a template of an output string, where the candidate string has a plurality of character positions, each character position of the candidate string being associated with a set of one or more candidate characters located at related positions in the target image, at least one of the character positions being associated with a plurality of candidate characters, the transforming of the candidate string to satisfy the template being dependent on which candidate character of each set of candidate characters is identified as satisfying a respective character set of the template, as discussed below.

Figure 2:
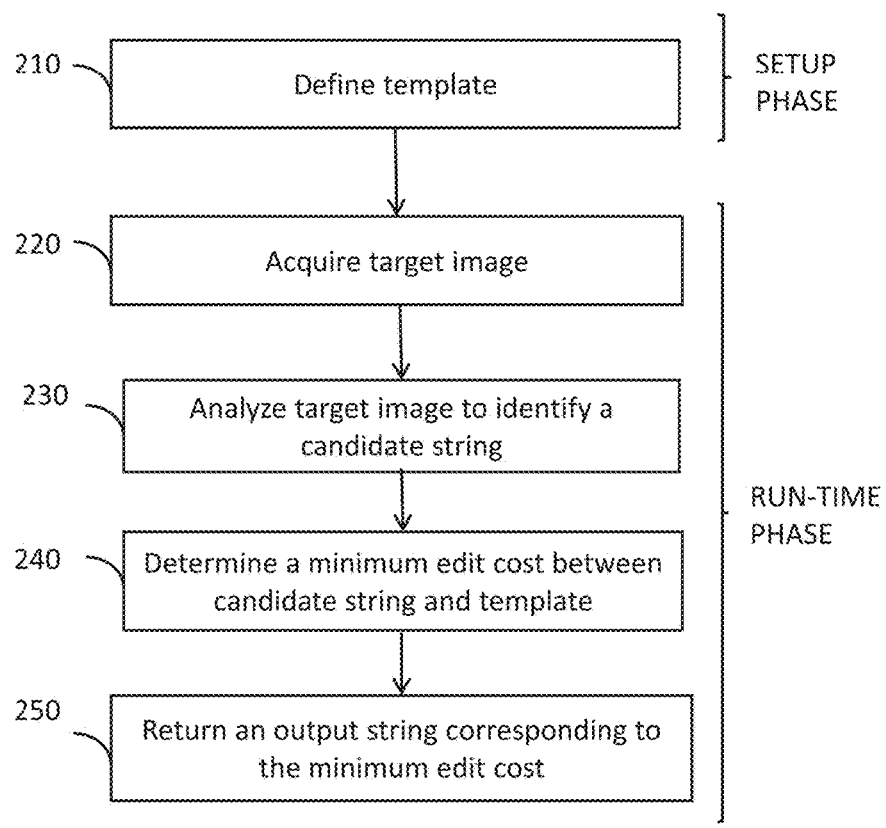
FIG. 2 is a flowchart illustrating the principal steps of recognizing a string of characters in a target image, according to an embodiment of the present invention.

FIG. 2 is a flowchart illustrating the principal steps of recognizing a string of characters in a target image, according to an embodiment of the present invention. The method comprises a setup phase (step 210) and a run-time phase (steps 220-250).

During the setup phase (at step 210), a context for processing candidate strings is defined. In various embodiments, defining a context (at step 210) includes defining a template for an output string. In some embodiments, defining a context (at step 210) includes defining a set of allowable edit operations that can be performed on a candidate string and defining a cost equation associated with each allowable edit operation, as will be described further below.

In some embodiments, defining a context (at step 210) includes defining context information such as the number of output strings to be read in the target image; for each output string, one or more templates the respective output string can satisfy; and optionally, information on the order in which the strings should appear in the target image. For example, a user may specify to search for a sequence of two strings (in reading order), where the first string satisfies a first template and the second string satisfies a second template. The context (e.g., the template or context information) may be hard-coded or provided by a software developer or end user, for example.

In an embodiment of the present invention, a template T for an output string has multiple output character positions, each output character position j being associated with a character set $C_j$. Thus, template T can be represented as a sequence of M character sets $C_j$:

$$T = C_1 C_2 \ldots C_M$$

Each character set $C_j$ consists of a set of allowable characters for the respective character position j in the output string, where this set of allowable characters is for example a subset of an alphabet. One possible alphabet is the set of characters A-Z and numerals 0-9, though other alphabets can also be used. A character set $C_j$ can consist of a single character of an alphabet, several characters of an alphabet, or all characters of an alphabet. According to this embodiment, a string S preferably satisfies a template T if the string and the template are of the same length and if each character of the string belongs to the character set at the corresponding character position in the template.

Note that, in a variant embodiment, a template may consist of a sequence of character sets $C_j$ of variable length. The template may have a minimum length $L_{min}$ and a maximum length $L_{max}$, and a character set $C_j$ is defined for each character position j in the template in the range [1, $L_{max}$]:

$$T = C_1 C_2 \ldots C_{Lmin} \ldots C_{Lmax}$$

According to this variant embodiment, a string S preferably satisfies a template T if the length of the string belongs to the range [$L_{min}$, $L_{max}$] defined by the minimum and maximum lengths of the template and if each character of the string belongs to the character set at the corresponding character position in the template.

Returning to FIG. 2, the run-time phase (steps 220-250) comprises the steps of acquiring a target image (at step 220), analyzing the target image to identify a candidate string (at step 230), determining a minimum edit cost between the candidate string and a template defined during the setup phase (at step 240), and returning an output string corresponding to the minimum edit cost (at step 250). The steps of this run-time phase will now be described in greater detail.

At step 220, a target image is acquired. The target image may consist of a grayscale or color image acquired by a camera or other image acquisition device, on which one or more image processing operations may optionally have been performed. Such image processing operations include but are not limited to analog-to-digital conversion, down-sampling, thresholding, morphological processing, etc. Also, the target image may consist of a portion of a larger image acquired by an image acquisition device corresponding to a region of interest in the image.

At step 230, the acquired target image is analyzed to identify therein a candidate string, using an optical character recognition process.

Figure 3:
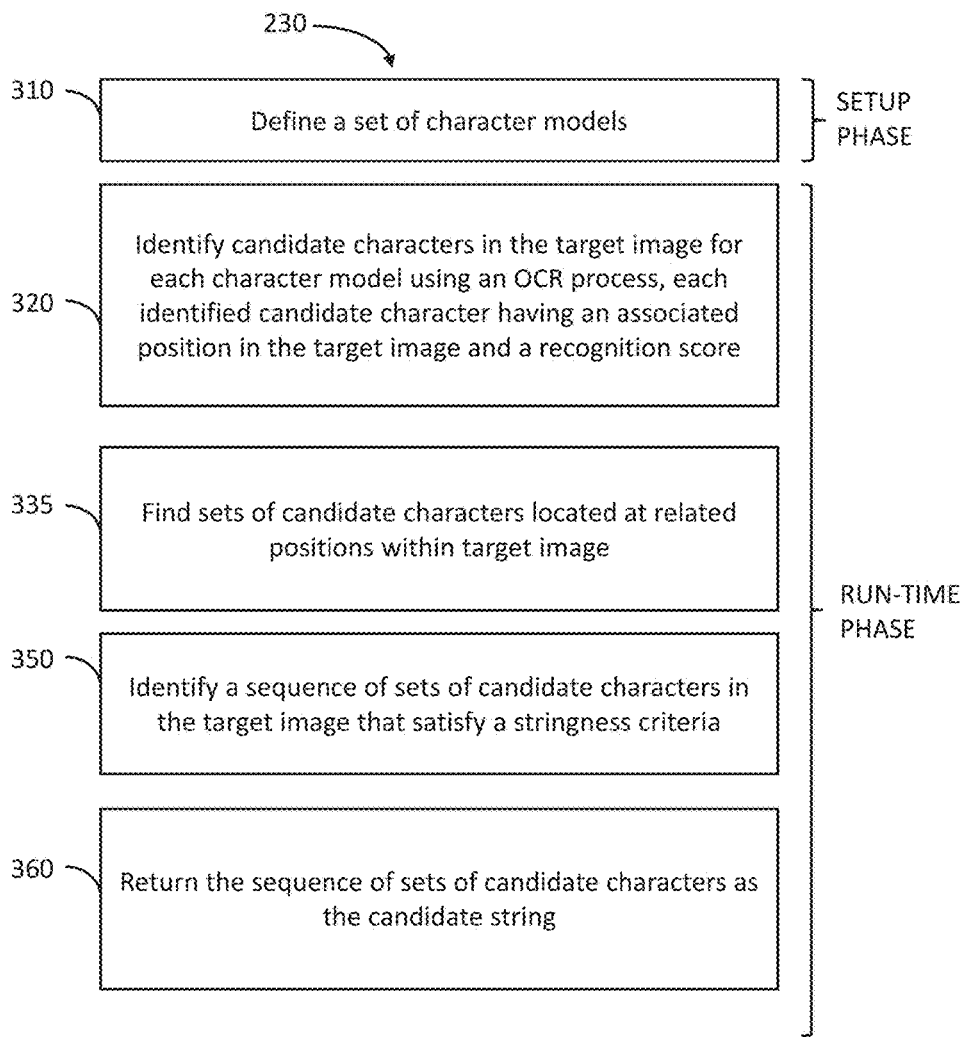
FIG. 3 is a flowchart illustrating the principal steps of analyzing a target image to identify a candidate string, according to an embodiment of the present invention.

FIG. 3 is a flowchart illustrating the principal steps of analyzing a target image to identify a candidate string, according to an embodiment of the present invention. The method includes both a setup phase (step 310) and a run-time phase (steps 320-360).

During the setup phase (step 310), a context for analyzing the target image to identify candidate strings using an optical character recognition process is defined. In various embodiments, defining a context (at step 310) includes defining a set of character models. In some embodiments, the set of character models is defined on the basis of the one or more alphabets over which the template(s) are defined. In some embodiments, each defined character model includes a label and a model image. In other embodiments, each defined character model includes only a label. In some embodiments, defining a context (at step 310) includes defining parameters related to a "stringness" criterion, as will be detailed below.

Figure 4:
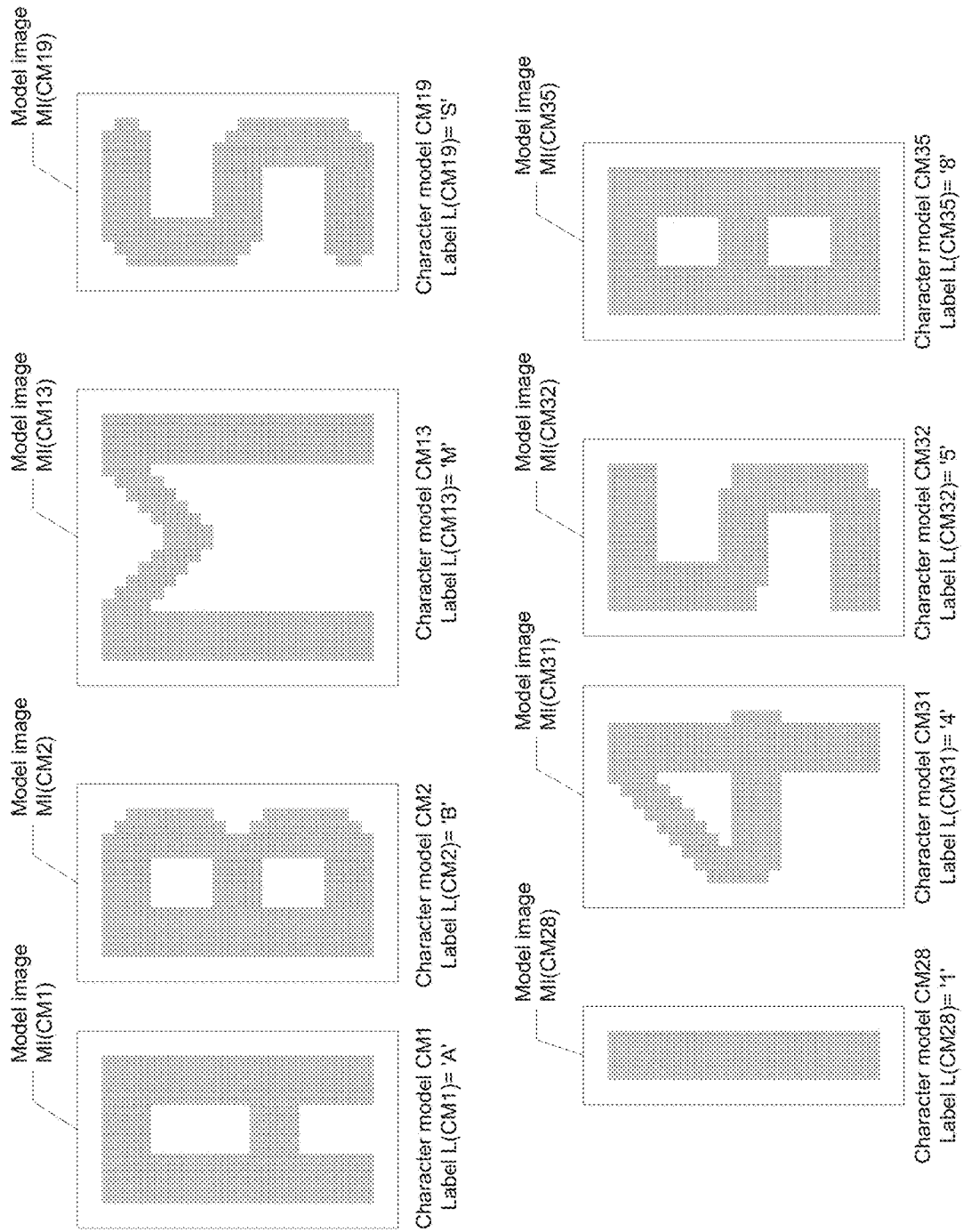
FIG. 4 illustrates a set of character models, according to a non-limiting example of implementation of the present invention.

FIG. 4 illustrates a non-limiting example of a set of defined character models. In this example the set of character models is defined on the basis of the alphabet that is the set of characters A-Z and digits 0-9 and corresponds to a subset of this alphabet. Note however that the set of character models may be defined on the basis of any other alphabet, and may further be defined on the basis of several different alphabets. In the non-limiting example of FIG. 4, each character model CMi is associated with a corresponding model image MI(CMi) and a label L(CMi). Thus, for example, character model CM1 is associated with both the model image MI(CM1) and the label L(CM1)='A', while character model CM28 is associated with both model image MI(CM28) and the label L(CM28)='1'. It should be noted that various different nomenclatures for identifying each character model, model image and label are possible and included within the scope of the present invention.

Returning to FIG. 3, the run-time phase (steps 320-360) includes the steps of identifying candidate characters in the target image for each character model using an optical character recognition process (step 320), finding sets of candidate characters located at related positions within the target image (step 335), identifying a sequence of sets of candidate characters in the target image that satisfy a stringness criteria (step 350) and returning the identified sequence of sets of candidate characters as a candidate string (step 360). The steps of this run-time phase will now be described in greater detail.

At step 320, an optical character recognition (OCR) process is applied to the target image to identify candidate characters in the target image for the defined character models. In various embodiments, each identified candidate character is a potential match in the target image for a character model among the set of character models and has associated information such as a reference to the particular character model that was matched, a position in the target image where the particular character model was matched, and a recognition score associated with the OCR process. For example, a position may consist of the indices (i,j) of a pixel where i, j may be integer or non-integer values (providing for sub-pixel accuracy).

In some embodiments, at step 320, for each defined character model, the OCR process identifies candidate characters, if any, in the target image that "match" the model image of the respective character model by determining a recognition score between a portion of the target image and the model image of the respective character model. In such embodiments, a recognition score may be a measure indicative of a degree of similarity between a portion of the target image and the model image of a particular character model. In a specific, non-limiting example of implementation, the OCR process applies matrix matching to compare the target image to the defined character models on a pixel-by-pixel basis (i.e. "pattern matching" or "pattern recognition" or "image correlation") and uses a normalized correlation algorithm to determine recognition scores between characters identified in the target image and the defined character models. Note however that different types of OCR processes and algorithms exist and may be used to identify candidate characters in a target image and/or to determine recognition scores, without departing from the scope of the present invention.

In some embodiments, a recognition score is determined by comparing values of pixels in the target image with values of pixels in the model image, for example, using normalized grayscale correlation. In other embodiments, a recognition score is determined by extracting a set of features from the model, extracting a similar set of features from the target, and then determining associations between the model and target feature sets. For example, the set of features can be the coordinates of edge points, interest points or other local features, and determining associations can be performed using a geometric hashing, Hough transform, or generalized Hough transform technique. In other embodiments, a recognition score is determined by extracting a feature vector from the target image and model image, respectively, and then determining a score (e.g., based on a Euclidean distance) between the target and model feature vectors.

In some embodiments, an OCR process based on artificial intelligence is employed at step 320. In this case, a recognition score may be a measure of the likelihood that a portion of the target image corresponds to a particular character model determined based on the samples provided for the character model during a training stage.

Note that various different techniques exist and may be used for establishing recognition scores between character models and characters in a target image. Furthermore, the assessed recognition scores for a target image may be manipulated in different, known ways to ascertain whether or not matches have been identified between character models and the target image. In one example, the OCR process may define a match between a certain character in the target image and the model image of a particular character model if the determined recognition score between them is greater than a predefined threshold, in which case that certain character is identified as a candidate character in the target image. In another embodiment, all matches are returned as candidate characters regardless of their recognition scores.

Figure 5:
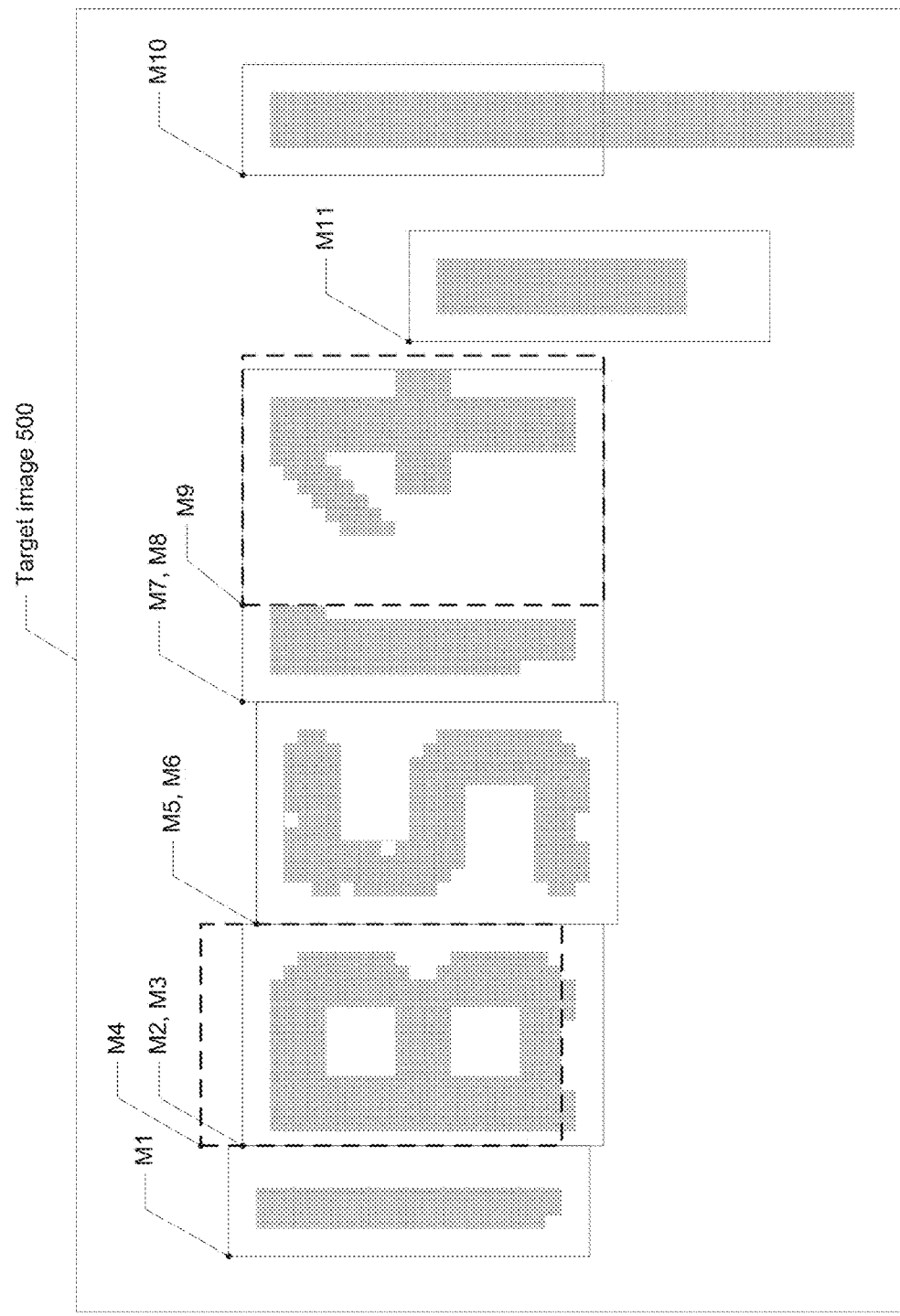
FIG. 5 illustrates a non-limiting example of a target image containing a string of characters to be recognized, and the identification of candidate characters within this target image, according to a non-limiting example of implementation of the present invention.

In order to illustrate the step 320 of identifying candidate characters in a target image, take for example the target image 500 shown in FIG. 5 and assume that this target image 500 is acquired at step 220 (see FIG. 2) to undergo the string recognition process, on the basis of the exemplary set of defined character models shown in FIG. 4. In this particular, non-limiting example, when the target image 500 is subject to the OCR process at step 320, eleven (11) matches (or candidate characters) are identified in the target image 500, notably Mj for j in the range [1, 11], as seen in FIG. 5. With reference to FIG. 6, each match Mj identified in the target image is associated with a matched character model MCMj, a position Xj, a recognition score Sj and a label Lj. Thus, one identified candidate character in the target image 500 is defined by a match M1 at position X1 with character model CM28 and thus label '1', having an associated recognition score of 0.88. Another identified candidate character in the target image 500 is defined by a match M4 at position X4 with character model CM1 and thus label 'A', having an associated recognition score of 0.75. Yet another identified candidate character in the target image 500 is defined by a match M7 at position X7 with character model CM13 and thus label 'M', having an associated recognition score of 0.92. Note that the recognition scores are provided for illustrative purposes only.

Returning now to FIG. 3, at step 335 sets of candidate characters located at related positions within the target image are identified. In various embodiments, two candidate characters are determined to be located at related positions if they "overlap" in some way. In some embodiments, two candidate characters are determined to be overlapping if their bounding boxes overlap. In other embodiments, two candidate characters are determined to be overlapping if their foreground pixels overlap. In some embodiments, a set of candidate characters identified at step 335 consists of an ordered set of candidate characters where candidate characters within the set are ordered based on recognition scores. In some embodiments, a set of candidate characters identified at step 335 consists of a hierarchical set of candidate characters where candidate characters within the set are ranked based on their recognition scores and their positional relationship, as will be described below. Both an ordered set of candidate characters and a hierarchical set of candidate characters include a primary candidate character having the highest recognition score among the set and may include one or more secondary candidate characters having lower recognition scores. In some embodiments, a set of candidate characters can include an "associated" (or "exclusive") secondary candidate character that is exclusive to the set of candidate characters and a "non-associated" (or "non-exclusive") secondary candidate character that also belongs to another set of candidate characters. In some embodiments, a set of candidate characters identified at step 335 consists of an unordered set of candidate characters in which candidate characters within the set are not necessarily ordered based on recognition scores.

Figure 7:
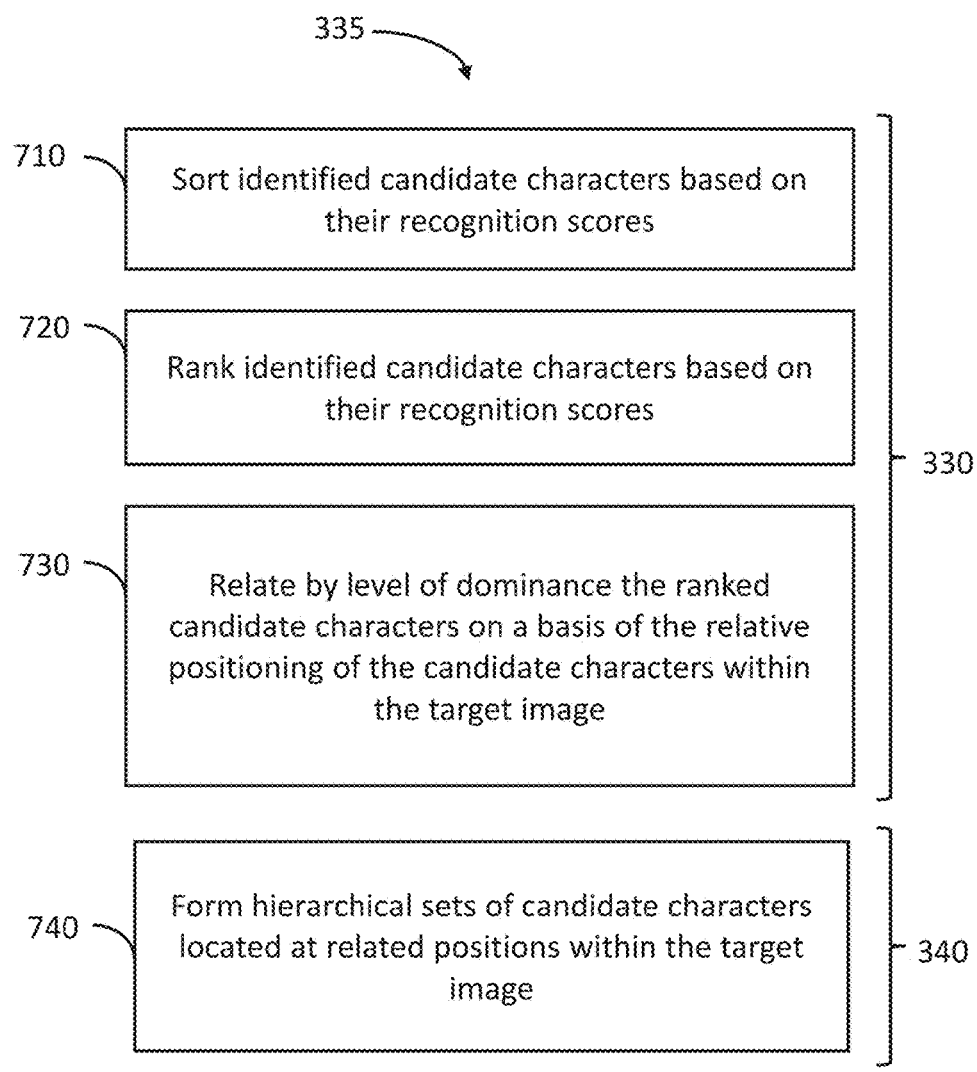
FIG. 7 is a flowchart illustrating the principal steps of finding sets of candidate characters located at related positions within the target image, according to an embodiment of the present invention.

FIG. 7 is a flowchart illustrating the principal steps of finding sets of candidate characters located at related positions in the target image (at step 335), according to an embodiment of the present invention. The method includes sorting the identified candidate characters on a basis of their recognition scores (step 710), ranking each identified candidate character on a basis of its respective recognition score (step 720), relating by level of dominance the ranked candidate characters on a basis of the relative positioning of the candidate characters within the target image (step 730) and forming hierarchical sets of candidate characters located at related positions within the target image (step 740). These steps will now be described in greater detail, in accordance with an embodiment of the present invention. Note that the candidate characters can be ranked based on their recognition scores (at step 720) without prior sorting of the candidate characters (at step 710).

At step 710, the candidate characters (or matches) that were identified by the OCR process in the target image are sorted based on their respective recognition scores, from best recognition score to worst recognition score. Thus, in the case where a higher recognition score indicates a better match, an order of the identified candidate characters is established, from the candidate character with the highest corresponding recognition score to the candidate character with the lowest corresponding recognition score. Once sorted, the candidate characters (or matches) are ranked at step 720, once again from best to worst recognition score. Thus, in the case where a higher recognition score indicates a better match, the candidate character with the highest corresponding recognition score is ranked highest, while the candidate character with the lowest corresponding recognition score is ranked lowest.

Note that, during the sorting of the identified candidate characters, when two or more candidate characters have the same corresponding recognition scores, these two or more candidate characters may be randomly arranged with respect to one another in the established order of the candidate characters or arranged according to other criteria.

Figure 8:
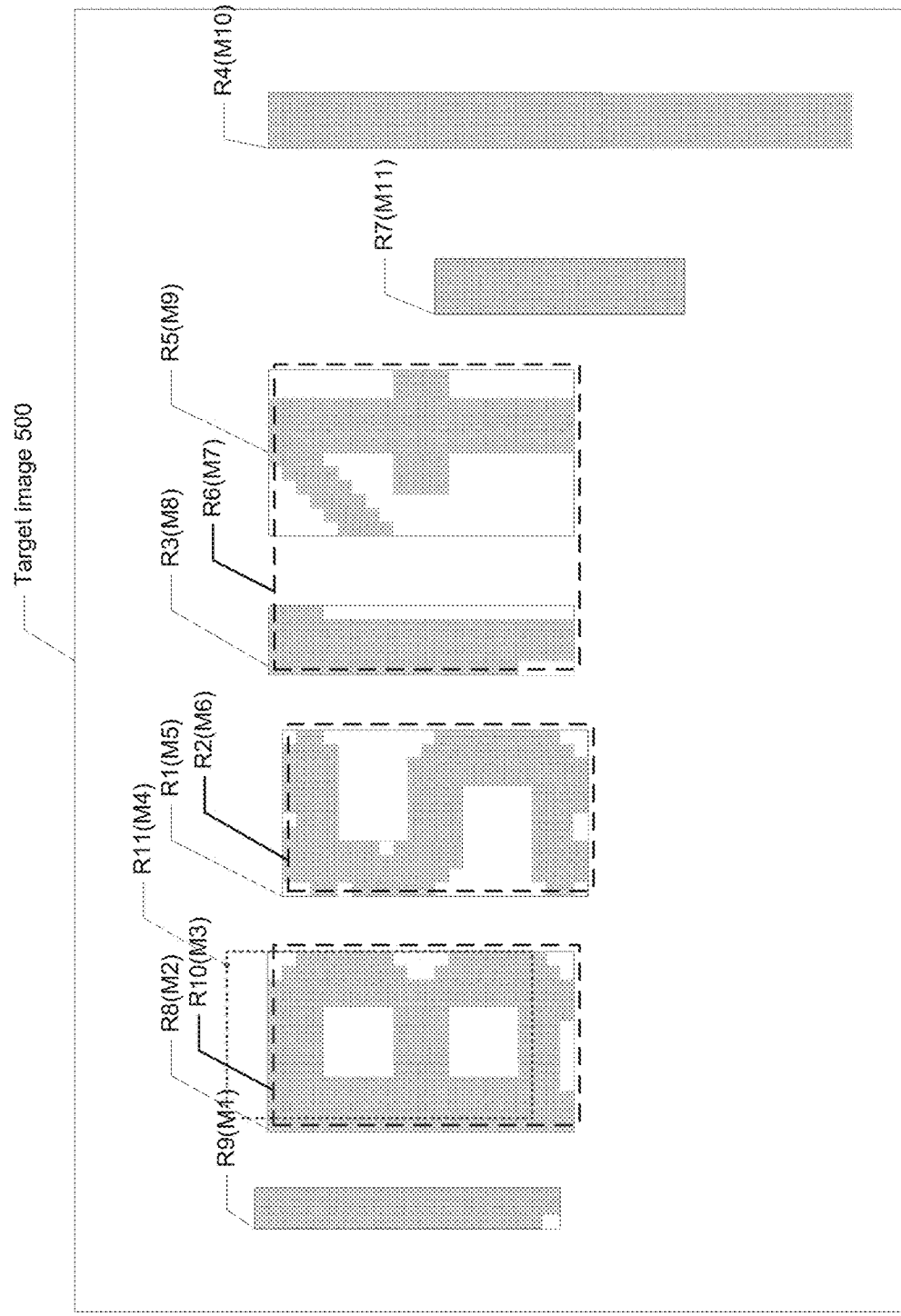

Continuing with the example of FIGS. 5 and 6, in which candidate characters (or matches) Mj for j=[1,11] were identified in target image 500, FIGS. 8 and 9 illustrate how these candidate characters Mj are sorted and ranked on a basis of their recognition scores Sj, in accordance with an example of implementation of the present invention. Thus, the matches are sorted in order of decreasing recognition scores from M5 (with the highest recognition score of 0.98) to M4 (with the lowest recognition score of 0.75). The ordered matches are then assigned a rank Rj for j=[1-11], where R1 is the highest ranking, awarded to match M5 which has the greatest recognition score, and R11 is the lowest ranking, awarded to match M4 with the lowest recognition score.

Returning to FIG. 7, once sorted and ranked, the ranked candidate characters are related by level of dominance at step 730, on a basis of the relative positioning of the candidate characters within the target image. More specifically, for each candidate character, it is determined if any another candidate character of higher rank is located at a related position within the target image. Furthermore, when, for a given candidate character, one or more other candidate characters of higher rank are identified as being located at a related position in the target image, a relative level of dominance is determined for each of the given candidate character and the one or more other candidate characters of higher rank, on a basis of the relative positioning of these candidate characters in the target image.

Thus, when two or more candidate characters are located at related positions in the target image, it is the candidate character with the highest ranking (and thus the best recognition score) of the two or more candidate characters that is considered to be the dominant candidate character (i.e. having the highest level of dominance) of the group. The lower ranked candidate characters of the two or more candidate characters are considered to be less dominant (i.e. have lower levels of dominance), where these lower levels of dominance may be the same for all of the lower ranked candidate characters or differ amongst themselves (i.e. one of the lower ranked candidate characters may be identified as being more dominant than the other(s) of the lower ranked candidate characters).

Figure 10:
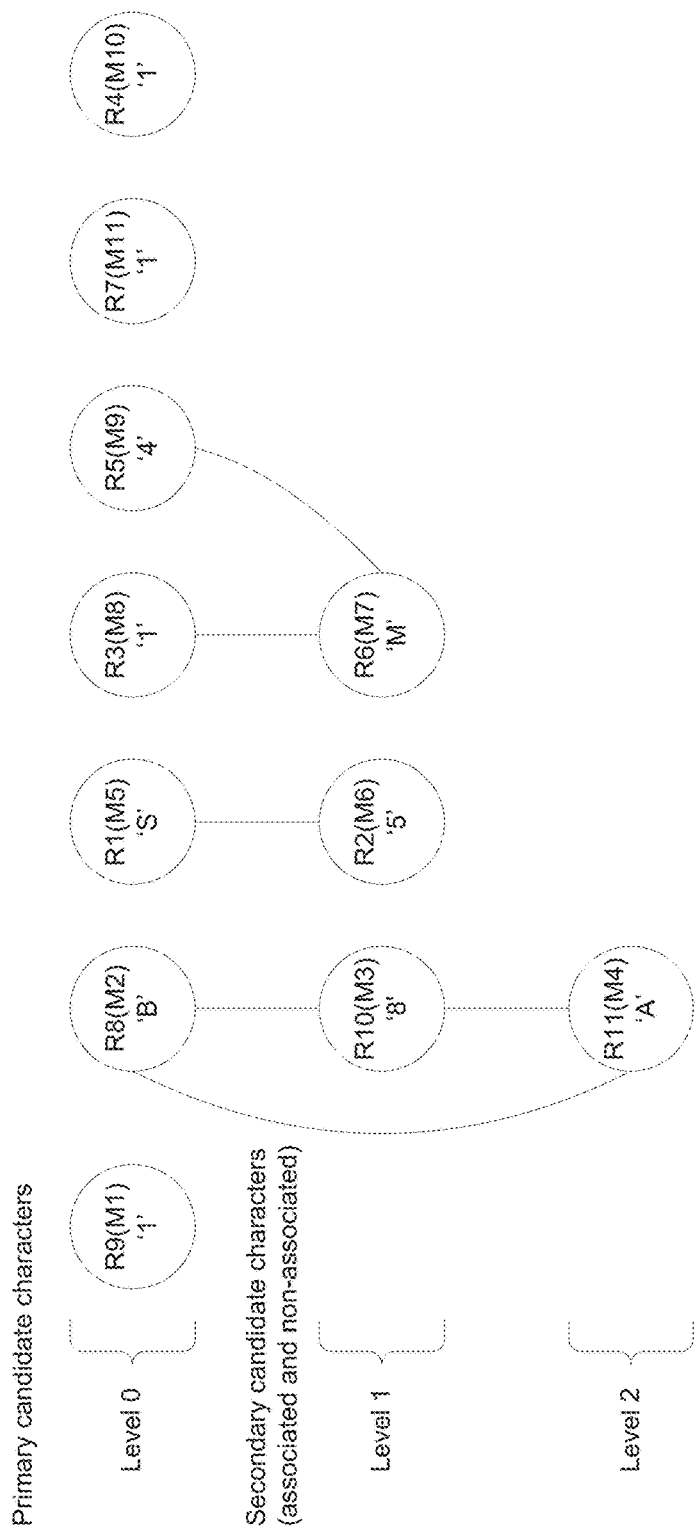

In order to illustrate the step 730 of relating by level of dominance the ranked candidate characters, continue with the example of FIG. 8 in which the candidate characters (or matches) M1-M11 identified in target image 500 have been sorted and ranked on a basis of their recognitions scores Sj. FIGS. 9 and 10 illustrate how candidate characters M1-M11 are related by level of dominance, in accordance with an example of implementation of the present invention.

Firstly, from the relative positioning of the candidate characters (or matches) M1-M11 shown in FIG. 8, it can be determined that matches M2, M3 and M4 are located at related positions X2, X3 and X4; matches M5 and M6 are located at related positions X5 and X6; matches M7 and M8 are located at related positions X7 and X8; and matches M7 and M9 are located at related positions X7 and X9.

As seen in FIG. 9, for each candidate character (or match) Mj, proceeding in the ranked order of candidate characters from M5 (at rank R1) to M4 (at rank R11), it is determined if any higher-ranked candidate characters are located at a related position in the target image. Thus, for candidate character M5 (at rank R1), there are no higher-ranked candidate characters at a related position in the target image, since candidate character M5 has the highest ranking of all of the candidate characters M1-M11. However, for candidate character M6 (at rank R2), candidate character M5 (at rank R1) is identified as being a higher-ranked candidate character located at a related position in the target image. For candidate character M7 (at rank R6), candidate characters M8 (at rank R3) and M9 (at rank R5) are both identified as being higher-ranked candidate characters at related positions in the target image. Similarly, for candidate character M4 (at rank R11), candidate characters M2 (at rank R8) and M3 (at rank R10) are both identified as being higher-ranked candidate characters at related positions in the target image.

With reference to FIG. 10, the candidate characters M1-M11 are related by level of dominance, on a basis of their relative positioning within the target image 500. Thus, candidate characters M1, M2, M5, M8, M9, M11 and M10, which were each identified as having no higher-ranked candidate characters located at related positions, are all determined to have a level of dominance of 0, defined in this example as the highest level of dominance.

Candidate characters M3, M6 and M7 are all determined to have a level of dominance of 1, since for each of these candidate characters there is one higher-ranked candidate character located at a related position in the target image 500. More specifically, for candidate character M3 (at rank R10), there is a candidate character M2 of higher rank R8 located at a related position in the target image 500, such that candidate character M3 is determined to have a level of dominance of 1, as compared to the level of dominance of 0 of candidate character M2. Similarly, for candidate character M6 (at rank R2), there is a candidate character M5 of higher rank R1 located at a related position in the target image 500, such that candidate character M6 is determined to have a level of dominance of 1, as compared to the level of dominance of 0 of candidate character M5. Though for candidate character M7 (at rank R6) there are two candidate characters M8 and M9 of higher rank R3 and R5, respectively, located at related positions thereto, the candidate characters M8 and M9 are not themselves positionally related in the target image 500 (as seen in FIG. 8). As such, candidate character M7 is determined to have a level of dominance of 1, as compared to the level of dominance of 0 of each of candidate characters M8 and M9.

Finally, candidate character M4 is determined to have a level of dominance of 2 (the lowest level of dominance in this example), since there are two higher-ranked candidate characters located at related positions thereto in the target image 500 and these two higher-ranked candidate characters are themselves positionally related in the target image 500 with different respective levels of dominance. More specifically, for candidate character M4 (at rank R11), there is a candidate character M3 of higher rank R10 located at a related position in the target image 500, as well as a candidate character M2 of even higher rank R8 located at a related position in the target image 500, where candidate characters M3 and M2 are themselves positionally related in the target image 500. As such, the candidate character M4 is determined to have a level of dominance of 2, as compared to the level of dominance of 1 of candidate character M3 and the level of dominance of 0 of candidate character M2.

In a particular embodiment of the present invention, finding sets of candidate characters located at related positions within the target image includes, at step 730, designating certain candidate characters as primary candidate characters and others as secondary candidate characters. Furthermore, within the set of secondary candidate characters, each secondary candidate character may be designated as being either associated with a particular primary candidate character or non-associated.

In a specific, non-limiting example of implementation of the present invention, the candidate characters that are determined to have the highest level of dominance (e.g. level of dominance 0) within a target image are designated as primary candidate characters, while the candidate characters of lower levels of dominance within the target image are designated as secondary candidate characters. Furthermore, when a secondary candidate character is found to be related by position to a single primary candidate character, the secondary candidate character is deemed to be exclusive to that primary candidate character and thus designated as an associated secondary candidate character. However, when a secondary candidate character is related by position to two or more primary candidate characters (i.e. belongs to two or more different hierarchical sets of candidate characters), this secondary candidate character is not exclusive to any one primary candidate character and thus is designated as a non-associated candidate character.

Figure 11:
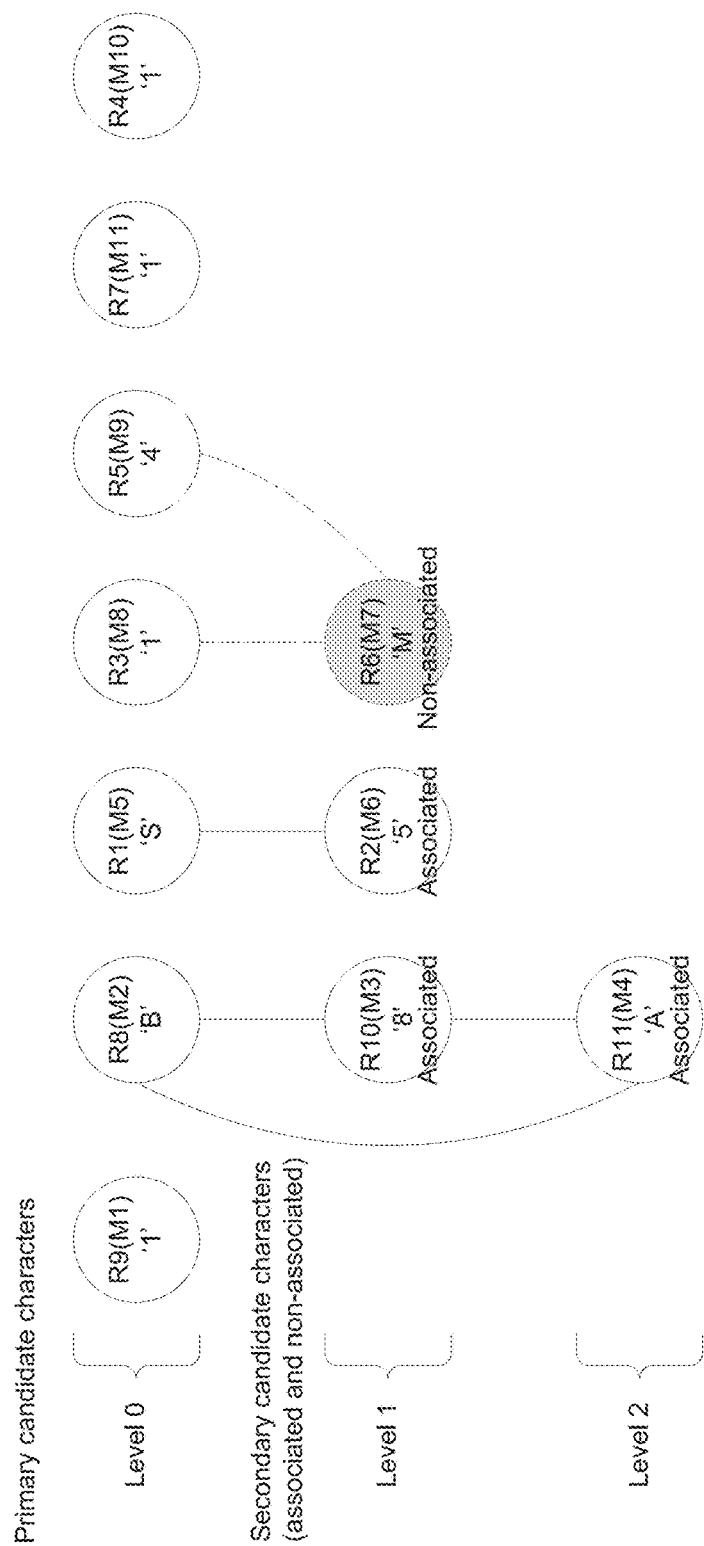

Thus, in the example shown in FIGS. 9 and 10, candidate characters (or matches) M1, M2, M5, M8, M9, M11 and M10 (of level of dominance 0) are designated as primary candidate characters, while candidate characters M3, M6, M7 and M4 (of level of dominance 1 or 2) are designated as secondary candidate characters. Continuing with this example, FIG. 11 illustrates the designation of secondary candidate characters as either associated or non-associated. Thus, secondary candidate characters M3, M4 and M6 are designated as "associated" with primary candidate characters M2, M2 and M5, respectively, while secondary candidate character M7 is designated as "non-associated" since candidate character M7 is not exclusive to either one of candidate characters M8 and M9.

Returning again to FIG. 7, once the ranked candidate characters have been related by level of dominance, these candidate characters are grouped into hierarchical sets at step 740, where each hierarchical set comprises one or more candidate characters located at related positions in the target image.

In the context of the present invention, the term "hierarchical set" refers to a group of candidate characters divided into different levels of dominance.

Thus, within each hierarchical set of candidate characters, there is one dominant candidate character of the highest level of dominance (e.g. level of dominance 0), also referred to herein as a primary candidate character. Each hierarchical set of candidate characters may also include one or more candidate characters of lower levels of dominance (e.g. level of dominance 1 or 2), also referred to herein as secondary candidate characters, each of which is located at a related position to that of the respective primary candidate character within the target image.

In a specific, non-limiting example of implementation of the present invention, a hierarchical set of candidate characters may only comprise one primary candidate character and any associated secondary candidate characters located at related positions in the target image. Thus, any secondary candidate characters designated as non-associated would be excluded from the hierarchical sets of candidate characters defined for a target image.

Continuing again with the example of candidate characters (or matches) M1-M11 of target image 500, FIG. 12 illustrates the seven hierarchical sets of candidate characters formed for target image 500. Five of these seven hierarchical sets of candidate characters are formed of a single primary candidate character, since we will assume for this example that non-associated candidate characters are not to be included in the hierarchical sets. Thus, each one of primary candidate characters M8, M10, M9, M11 and M1 forms its own hierarchical set of candidate characters. A sixth one of the seven hierarchical sets of candidate characters is formed of primary candidate character M5 (with ranking R1 and label "S") and associated secondary candidate character M6 (with ranking R2 and label "5"). A seventh one of the seven hierarchical sets of candidate characters is formed of primary candidate character M2 (with ranking R8 and label "B"), associated secondary candidate character M3 (with ranking R10 and label "8") and associated secondary candidate character M4 (with ranking R11 and label "A").

Returning now to FIG. 3, at step 350, a sequence of sets of candidate characters that together satisfy a stringness criteria is identified. In some embodiments, multiple sequences may be identified at step 350. In embodiments where a set of candidate characters determined at step 335 is an ordered or hierarchical set of candidate characters which includes a primary candidate and may include one or more secondary candidate characters, a sequence of sets of candidate characters satisfies a stringness criterion if the respective primary (or dominant) candidate characters satisfy the stringness criterion, in one example.

In the context of the present specification, the term "stringness criteria" refers to one or more rules or measures to be met by a sequence of characters in the target image in order to form a string of characters. Note that various different stringness criteria may be defined and applied to control how strings of characters are identified in a target image, without departing from the scope of the present invention. In a specific, non-limiting example of implementation, the stringness criteria include an alignment criterion and an inter-character spacing criterion. Note that the stringness criteria may be defined, for example, at step 210 (see FIG. 2) when the one or more templates are defined. Alternatively, the stringness criteria may be defined at step 310 (see FIG. 3) when the set of character models are defined, among many other implementation possibilities.

Figure 13:
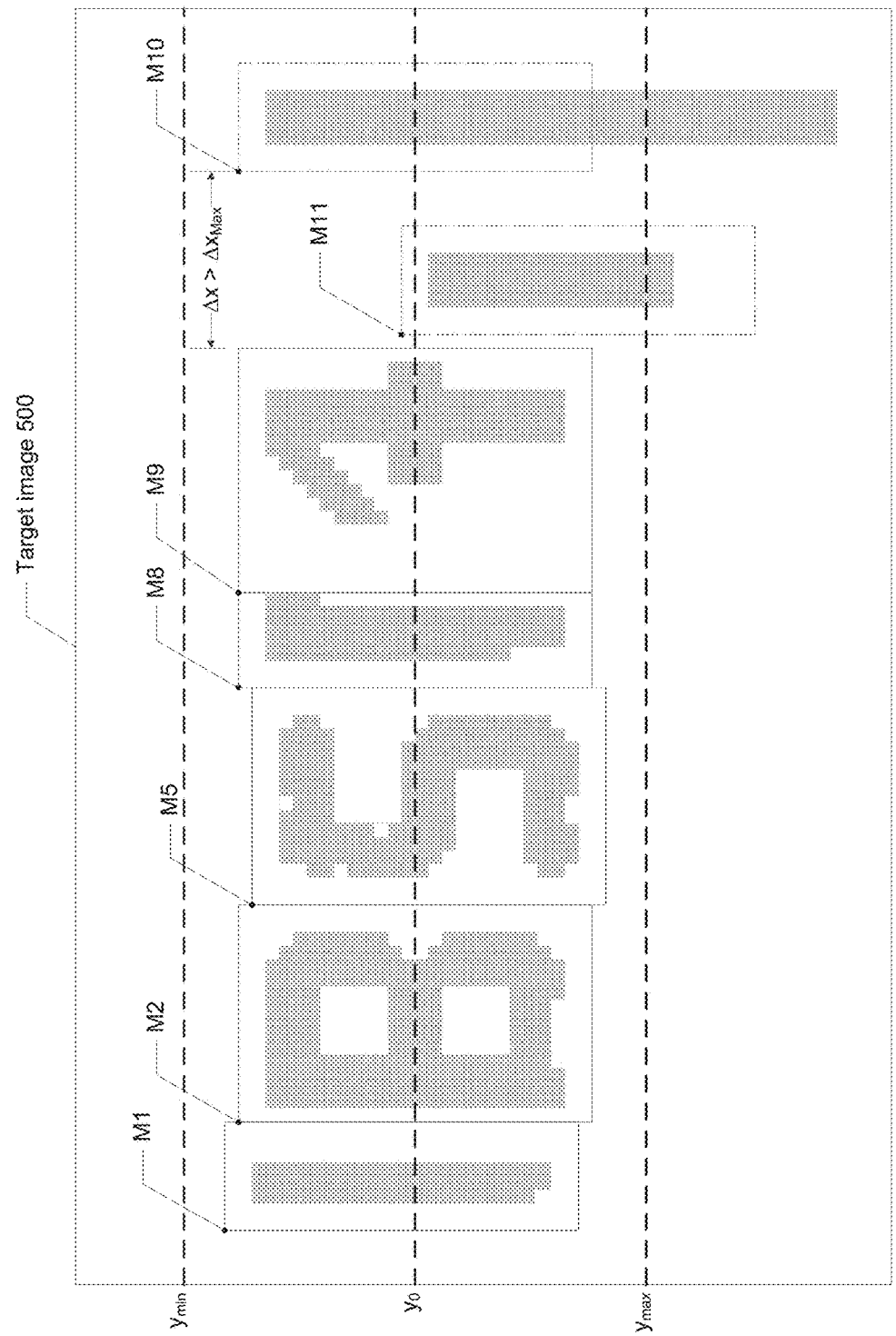
FIG. 13 illustrates the identification of a sequence of sets of candidate characters in the exemplary target image of FIG. 5, the sequence of sets of candidate characters satisfying a stringness criterion, according to a non-limiting example of implementation of the present invention.

Continuing once again with the example of target image 500 and the seven hierarchical sets of candidate characters identified therein (see FIG. 12), FIG. 13 illustrates the identification of a sequence of these hierarchical sets of candidate characters for which the dominant candidate characters (e.g. the primary candidate characters) satisfy a particular stringness criteria, according to a non-limiting example of implementation of the present invention. As shown in FIG. 13, the stringness criteria to be satisfied include an alignment criterion for the target image 500, where this alignment criterion is defined by upper boundary $y_{min}$, median line $y_0$ and lower boundary $y_{max}$. Thus, in this non-limiting example of implementation, the dominant candidate characters of each hierarchical set in the sequence must be positioned between the upper and lower boundaries $y_{min}$, $y_{max}$, respectively, as well as be crossed by the median line $y_o$. The stringness criteria to be satisfied also include a maximum inter-character spacing $\Delta x_{max}$ for the target image 500. Thus, in this non-limiting example of implementation, the spacing between adjacent dominant candidate characters of the sequence must be no greater than $\Delta x_{max}$.

With reference to FIG. 13, primary candidate characters M1, M2, M5, M8 and M9 satisfy the predefined stringness criteria and thus their respective hierarchical sets of candidate characters (including associated secondary candidate characters) are identified as a sequence of candidate character sets satisfying the stringness criteria for the target image. Note that primary candidate character M11 does not satisfy the alignment criterion (it extends below lower boundary $y_{max}$), while primary candidate character M10 does not satisfy the inter-character spacing criterion (its spacing $\Delta x$ from candidate character M9 is greater than $\Delta x_{max}$, given that candidate character M11 is excluded), such that the hierarchical sets of candidate characters formed for each of the primary candidate characters M11 and M10 are discarded from the sequence of candidate character sets identified in the target image 500.

Returning yet again to FIG. 3, at step 360, the sequence of sets of candidate characters that satisfy the stringness criteria is returned or output as a candidate string. This candidate string has an associated plurality of character positions, each character position being associated with a set of one or more candidate characters located at related positions in the target image, each candidate character having an associated recognition score. Specific to the present invention, at least one of the character positions of the returned candidate string is associated with a plurality of candidate characters.

Figure 15:
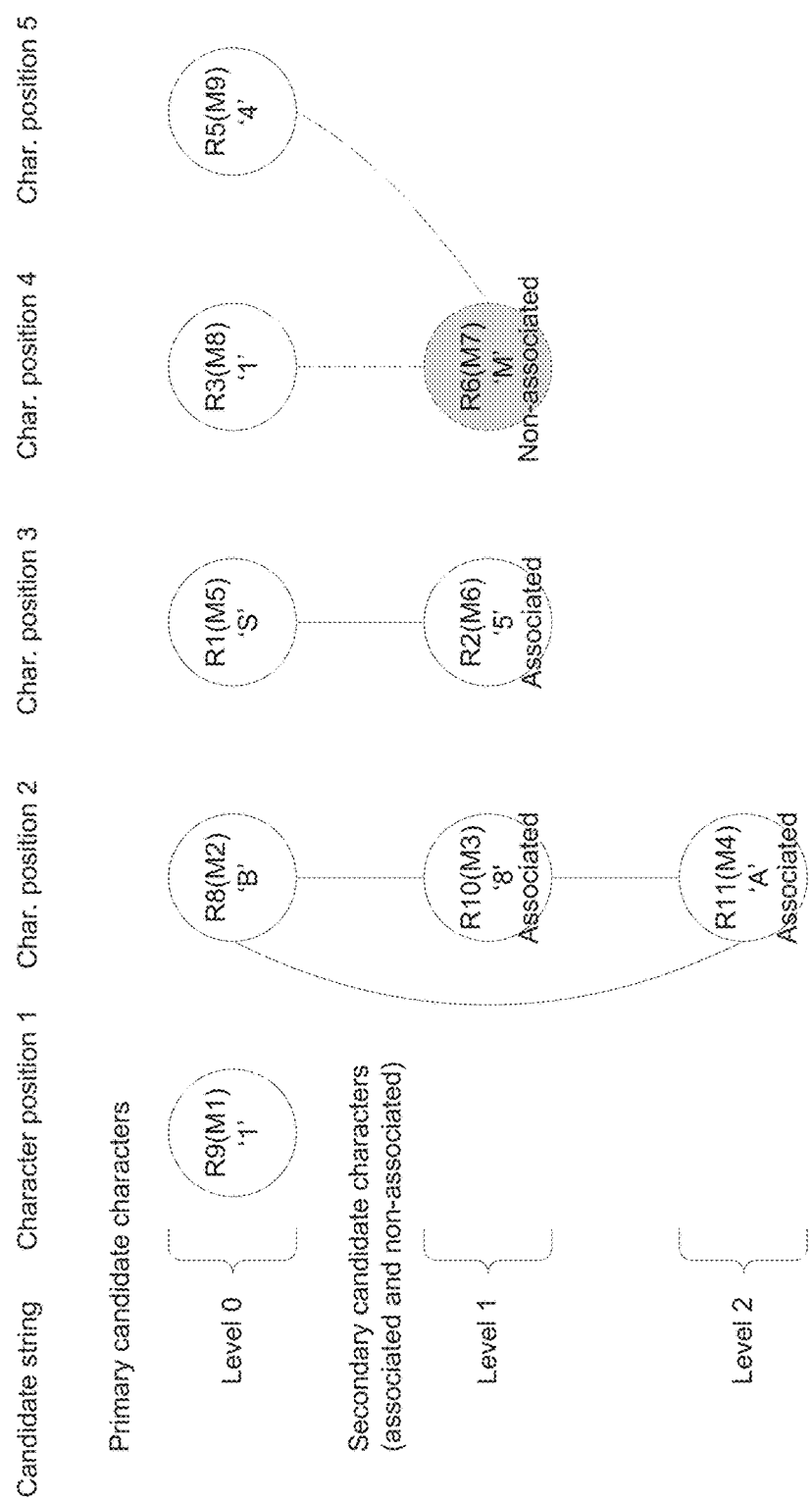

Continuing with the example of target image 500 and the sequence of five hierarchical sets of candidate characters (including associated secondary candidate characters) that is identified for the target image 500 (see FIG. 13), FIGS. 14 and 15 illustrate the candidate string that is returned after analyzing the target image 500. Thus, in this specific, non-limiting example of implementation, the returned candidate string includes at character position 1 the hierarchical candidate character set of candidate character M1; at character position 2 the hierarchical candidate character set of primary candidate character M2; at character position 3 the hierarchical candidate character set of primary candidate character M5; at character position 4 the hierarchical candidate character set of primary candidate character M8; and at character position 5 the hierarchical candidate character set of primary candidate character M9. As such, the returned candidate string includes at position 2 the secondary candidate characters M3 and M4 associated with primary candidate character M2, as well as includes at position 3 the secondary candidate character M6 associated with primary candidate character M5.

Note that, at step 360, returning a candidate string may optionally include returning, in addition to a sequence of sets of candidate characters satisfying the stringness criteria (including primary candidate characters and their associated secondary candidate characters), one or more non-associated secondary candidate characters. Thus, in the example of shown in FIG. 15, the non-associated secondary candidate character M7 may be returned along with the candidate string recognized in target image 500.

Returning now to FIG. 2, once a candidate string is returned for the target image (at step 230), the string recognition process determines at step 240 a minimum edit cost of transforming this candidate string to satisfy a template of an output string, where this template may be defined during the setup phase.

Generally, determining a minimum edit cost of performing edit operations on the candidate string to satisfy a template includes initial steps of defining a set of allowable edit operations that can be performed on a candidate string, and determining a cost equation associated with each allowable edit operation. These initial steps may be performed during a setup phase, for example.

According to an embodiment, the set of allowable edit operations that can be performed on a candidate string include a delete operation and a keep operation. The delete operation consists of deleting a set of candidate characters of the candidate string or, in other words, deleting a character position in the candidate string. The keep operation consists of keeping a candidate character of a set of candidate characters of the candidate string. According to another embodiment, the set of allowable edit operations further includes an insert operation. The insert operation consists of inserting a set of candidate characters into the candidate string, or in other words, inserting a character position into the candidate string.

In an embodiment employing an ordered or hierarchical set of candidate characters which includes a primary (or dominant) candidate character and may include one or more secondary candidate characters, the keep operation (also called the keep-or-replace operation) involves either keeping the primary candidate character or replacing the primary candidate character by a secondary candidate character belonging to the set of candidate characters. In an embodiment employing an unordered set of candidate characters, the keep operation involves keeping (or selecting) one of the candidate characters of the set of candidate characters.

According to an embodiment, the cost of an edit operation involving a particular candidate character Mk is determined based on the recognition score Sk of the particular candidate character. According to an embodiment, the cost $w_{del}(Mk)$ of deleting a particular candidate character Mk is proportional to the recognition score Sk of the candidate character such that a high recognition score results in a high cost for deleting the candidate character, and vice versa. In a non-limiting example where the recognition score Sk is a number between 0 and 1, the cost of deleting the candidate character Mk is determined as $w_{del}(Mk)=Sk$. According to an embodiment, the cost of keeping a particular candidate character Mk is inversely proportional or complementary to the recognition score Sk of the candidate character such that a high recognition score results in a low cost for keeping the candidate character, and vice versa. In a non-limiting example where the recognition score Sk is a number between 0 and 1, the cost of keeping the candidate character Mk is determined as $w_{keep}(Mk)=1-Sk$.

According to an embodiment, the cost of an edit operation involving a set of candidate characters CCi is determined based on the cost of an edit operation of a particular candidate character of the set of candidate characters CCi. According to an embodiment, the cost of deleting a set of candidate characters CCi of the candidate string is determined as the maximum cost among the costs $w_{del}(Mk)$ of the set of candidate characters CCi. In the case of an ordered or hierarchical set of candidate characters, this corresponds to the deletion of the primary or dominant candidate character. According to an embodiment, the cost of keeping a candidate character of a set of candidate characters CCi of the candidate string is determined as the minimum cost among the costs $w_{keep}(Mk)$ of the set of candidate characters CCi.

In some embodiments, the step of determining a minimum edit cost of transforming the candidate string to satisfy a template of an output string (at step 240) includes determining "set costs" of performing various sets (or combinations) of edit operations on the candidate string and determining the minimum cost using the set costs. In some embodiments, the step of determining a minimum edit cost (at step 240) is performed according to a dynamic programming algorithm, as is known from existing string correction systems.

Specific to the present invention, determining the minimum edit cost of transforming the candidate string to satisfy a template includes, for a given character position in the candidate string and a given output character position in the template, identifying within the respective set of candidate characters of the candidate string a subset of candidate characters that satisfy the respective character set of the template, and determining an edit cost based on the recognition score of one of the candidate characters belonging to the identified subset of candidate characters. Thus, in the course of determining a minimum cost to transform the candidate string to satisfy a template, the edit costs associated with certain edit operations are variable, dependent on which particular candidate character of the subset of candidate characters (that satisfies the respective character set of the template) is selected for use in each edit operation, and thus which respective recognition score is used to compute each edit cost.

Since at least one character position of the candidate string defines a plurality of candidate characters (e.g. a primary candidate character and one or more associated secondary candidate characters), the transformation of this candidate string to satisfy the template at a respective output character position is associated with a plurality of edit cost options, each edit cost option being associated with a particular one of the plurality of candidate characters.

When determining the minimum edit cost between the candidate string and the template, the choice of which candidate character of the plurality of candidate characters to use in an edit operation between the at least one character position of the candidate string and a respective output character position of the template, and thus the determining of a cost of this edit operation, is based at least on a type of edit operation to be performed.

Furthermore, for at least one type of edit operation (e.g., a keep-or-replace), the determination of a cost of an edit operation at a given character position in the candidate string is based on which candidate characters of the plurality of candidate characters associated with the given character position satisfy the respective character set of the template. Thus, for the at least one type of edit operation, if only a specific one of the plurality of candidate characters satisfies the respective character set of the template, the cost of the edit operation is based on the recognition score of that specific candidate character. If several different ones of the plurality of candidate characters satisfy the respective character set of the template, the cost of the edit operation is based on the greatest one of the recognition scores for the subset of candidate characters satisfying the respective character set of the template.

Thus, the determination of a set of edit operations to perform on the candidate string to transform the latter so as to satisfy a template is based on the plurality of candidate characters associated with one or more character positions of the candidate string (e.g. the primary candidate characters of the candidate string and any associated secondary candidate characters), as well as on the respective character sets of the template.

Figure 16:
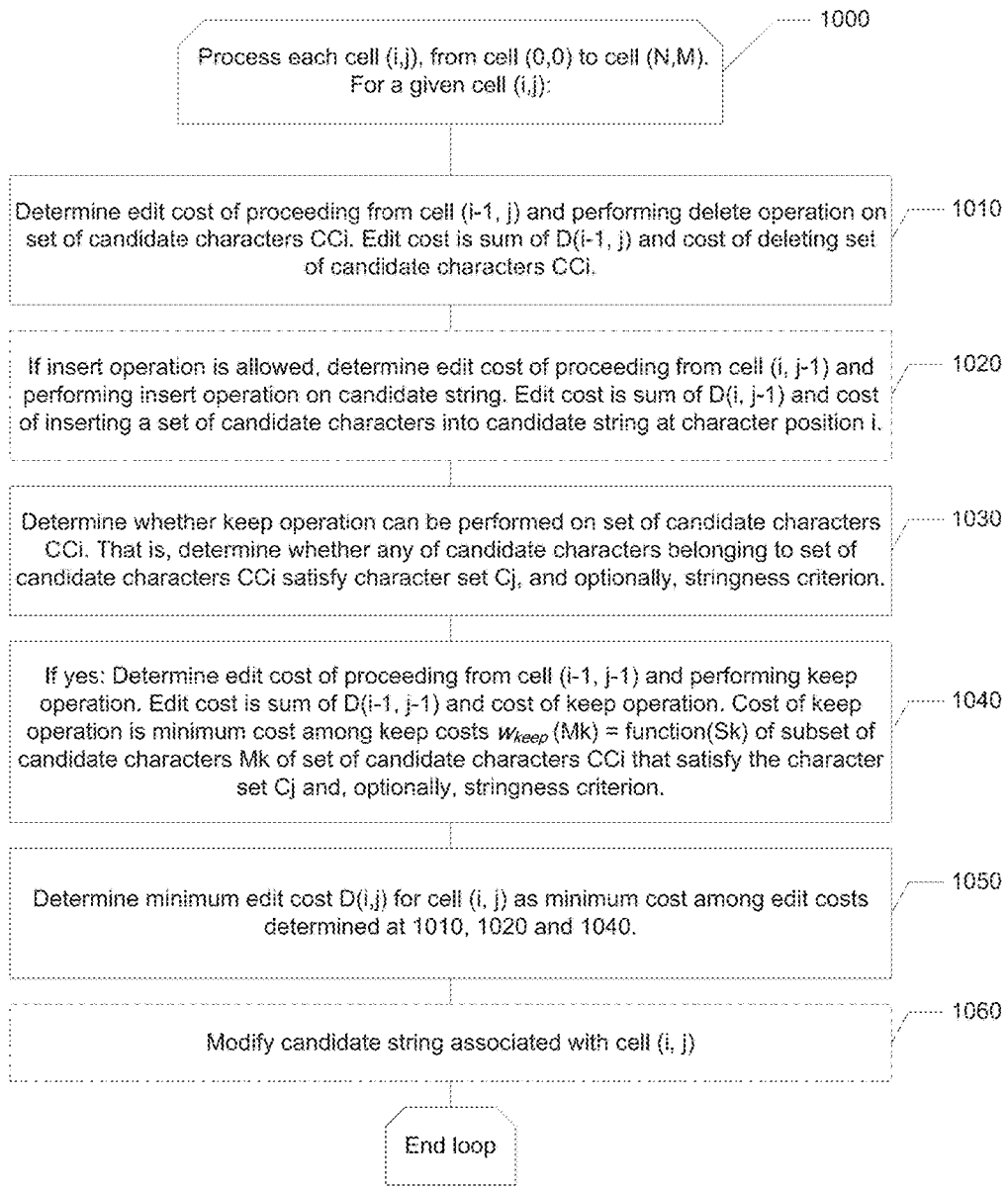
FIG. 16 is a flowchart illustrating the principal steps of determining a minimum edit cost between candidate string and template, according to a broad embodiment of the present invention.
Figure 24:
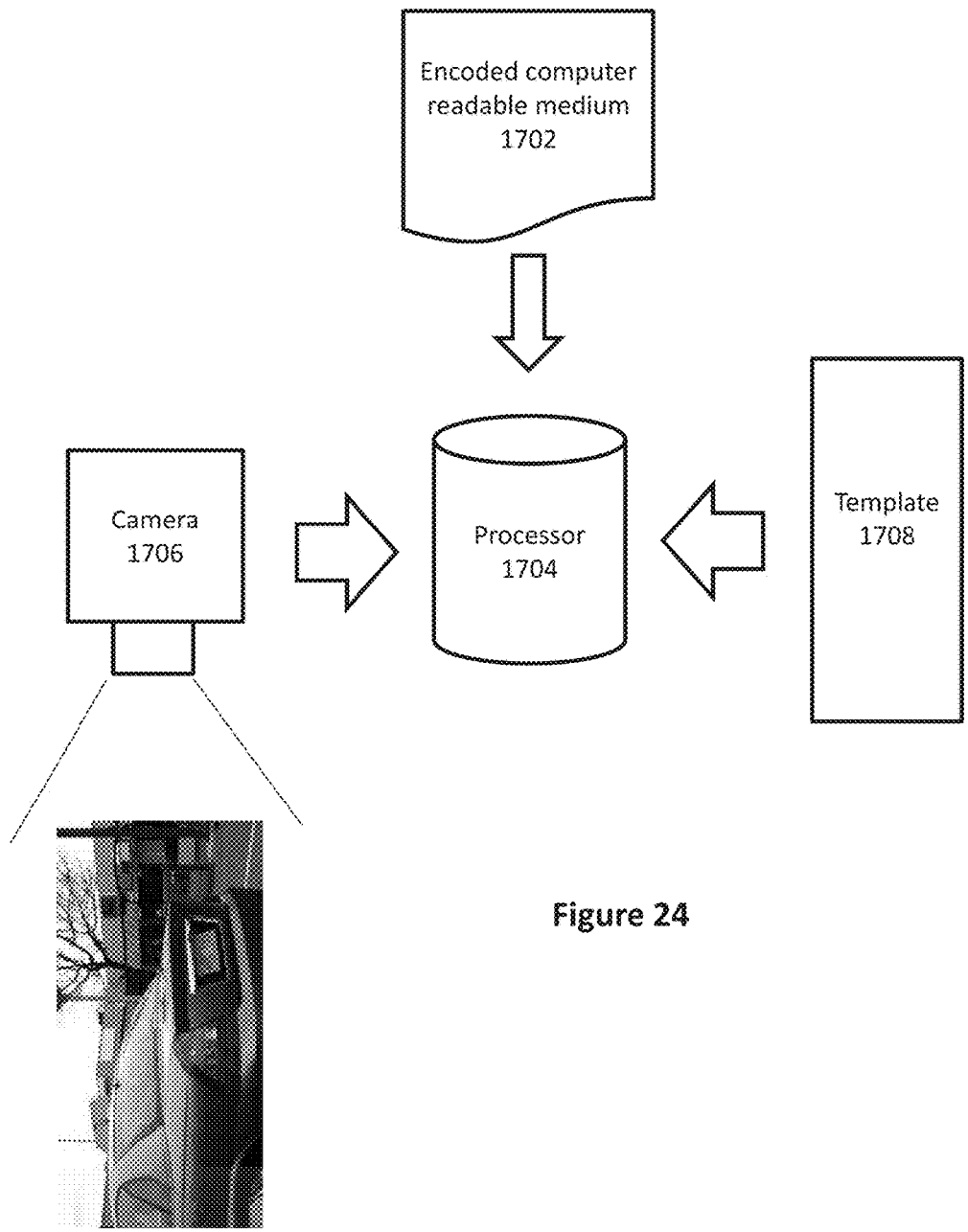
FIG. 24 is a block diagram of an image processing system, according to a broad embodiment of the present invention.
Figure 25:
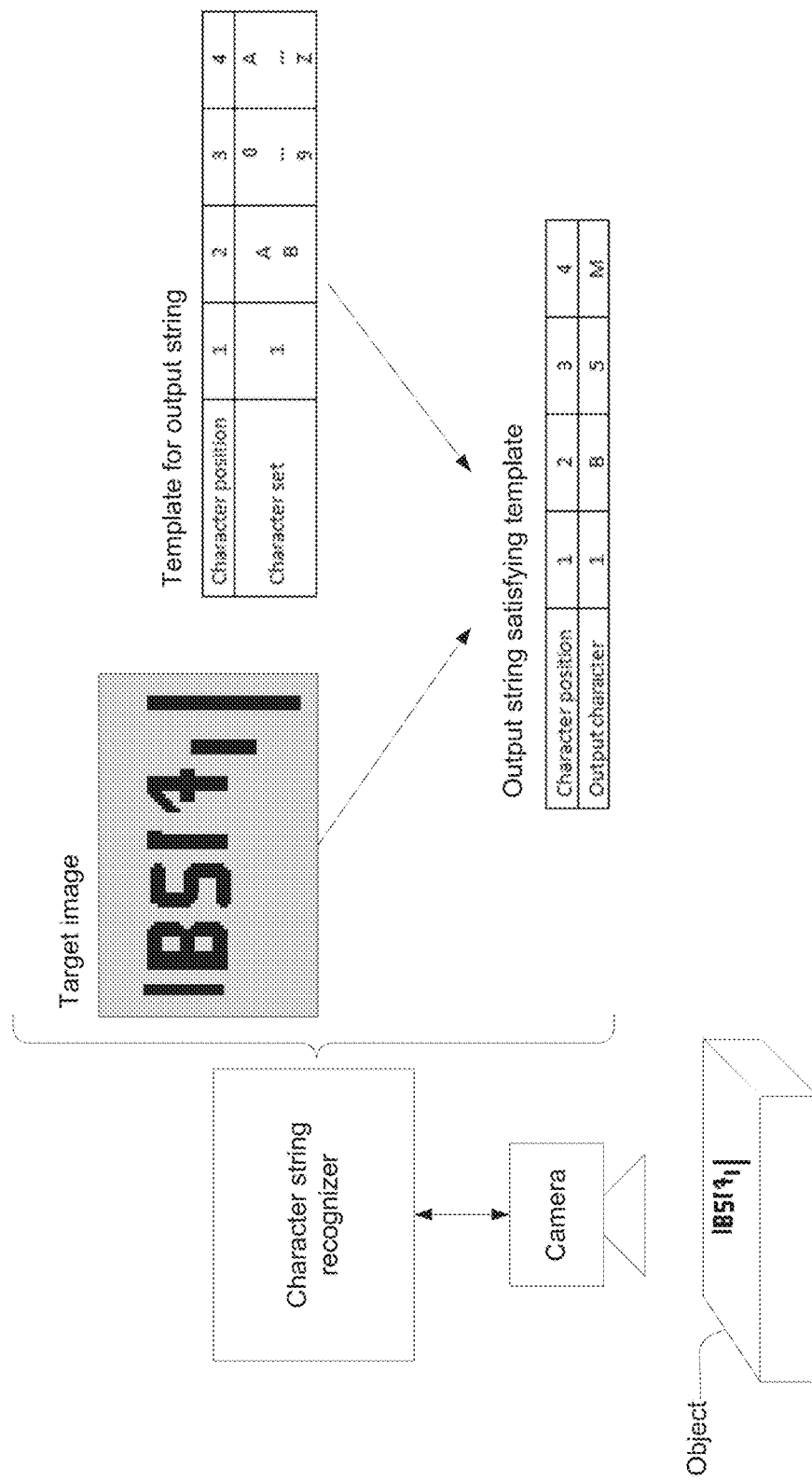
FIG. 25 illustrates an image processing system including a character string recognizer, the latter receiving a target image and a template for an output string and returning an output string, according to a broad embodiment of the present invention.

FIG. 16 is a flowchart illustrating the steps of determining a minimum edit cost between a candidate string CS and a template T for an output string, using a dynamic programming algorithm (DPA) and further using a dynamic programming algorithm array, according to an embodiment of the present invention. FIG. 17A illustrates the corresponding DPA array. Note that, in some embodiments, a minimum edit distance may be performed using a dynamic programming algorithm without using a DPA array. In the embodiment of FIGS. 24 and 25, the candidate string CS has character positions i=1 to N and corresponding sets of candidate characters CC1 to CCN, respectively, and the template has output character positions j=1 to M and corresponding character sets C1 to CM, respectively.

Referring to FIG. 17A, the DPA array includes an array of cells. To determine the minimum edit cost, each cell (i,j) of the DPA array is processed in turn, proceeding generally from the top-left cell (0,0) to the bottom-right cell (N,M) (at step 1000). For a given cell (i,j) corresponding to character position i and set of candidate characters CCi of the candidate string and output character position j and character set Cj of the template, the minimum edit cost D(i,j) is determined according to steps 1010-1060.

At step 1010, an edit cost of proceeding from cell (i−1, j) and performing a delete operation on the set of candidate characters CCi is determined. The edit cost is the sum of D(i−1, j) and the cost of deleting the set of candidate characters CCi. In some embodiments, the deletion cost is the maximum cost among the deletion costs $w_{del}(Mk)$ of the candidate characters Mk belonging to the set of candidate characters CCi. Generally, the deletion cost $w_{del}(Mk)$ of a candidate character Mk is an increasing function of its recognition score Sk, such as $w_{del}(Mk)=Sk$. In some embodiments, the deletion cost is the deletion cost $w_{del}(Mk)=Sk$ of the primary candidate character of the set of candidate characters CCi.

At step 1020, if an insert operation is allowed, an edit cost of proceeding from cell (i, j−1) and performing an insert operation on the candidate string is determined. The edit cost is the sum of D(i, j−1) and the cost of inserting a set of candidate characters into the candidate string at character position i. If the insert operation is not allowed, the edit cost can be set to a "not defined" value, such as a high value clearly outside the normal range for an edit cost.

At step 1030, it is determined whether a keep operation can be performed on the set of candidate characters CCi. In some embodiments, at step 1030, it is determined whether any of the candidate characters Mk belonging to the set of candidate characters CCi satisfy the character set Cj (e.g., its label Lk belongs to the character set Cj), and optionally, a stringness criterion. As described above, in some embodiments, a candidate string is identified by finding a sequence of sets of candidate characters in the target image whose primary candidate characters satisfy a string criterion. Therefore, in some embodiments, before replacing a primary candidate character by a secondary candidate character, it is first checked that this secondary candidate character also satisfies the string criterion (e.g., it is aligned with the other primary candidate characters forming the candidate string).

If it is determined (at step 1030) that a keep operation can be performed, the edit cost of proceeding from cell (i−1, j−1) and performing a keep operation is determined. The edit cost is the sum of D(i−1, j−1) and the cost of the keep operation. The cost of the keep operation is the minimum cost among the keep costs $w_{keep}(Mk)$ of the subset of candidate characters Mk belonging to the set of candidate characters CCi that satisfy the character set Cj and, optionally, the stringness criterion. Generally, the keep cost $w_{keep}(Mk)$ of a candidate character Mk is a decreasing function of its recognition score Sk, such as $w_{keep}(Mk)=1-Sk$. If it is determined (at step 1030) that a keep operation cannot be performed, the edit cost is set to a "not defined" value, such as a high value clearly outside the normal range for an edit cost.

At step 1050, a minimum edit cost D(i,j) for cell (i, j) is determined as the minimum cost among the edit costs determined at steps 1010, 1020 and 1040.

At step 1060, in some embodiments, the candidate string associated with cell (i, j) is modified, such that the minimum edit cost for subsequent cells is determined based on the modified candidate string (e.g., when determining an edit cost of proceeding from cell (i,j)).

If the minimum edit cost D(i, j) determined at step 1050 corresponds to a delete operation, the set of candidate characters CCi is discarded. In some embodiments, this involves discarding the primary candidate character and any associated (or exclusive) secondary candidate character of the set of candidate characters CCi. However, if the set of candidate characters CCi includes a non-associated (or non-exclusive) secondary candidate character M shared with another set of candidate characters CCx, the set of candidate characters CCx is modified by re-designating the candidate character M as an associated (or exclusive) candidate character.

If the minimum edit cost D(i, j) determined at step 1050 corresponds to a keep operation, it is determined whether to modify the candidate string. In some embodiments, if a primary candidate character is kept, no modification is necessary. However, if the primary candidate character is replaced by a secondary candidate character, the primary candidate character and any secondary candidate character that dominates the kept secondary candidate character are discarded and the kept secondary candidate character is re-designated as the primary candidate character for the set of candidate characters CCi.

Figure 20:
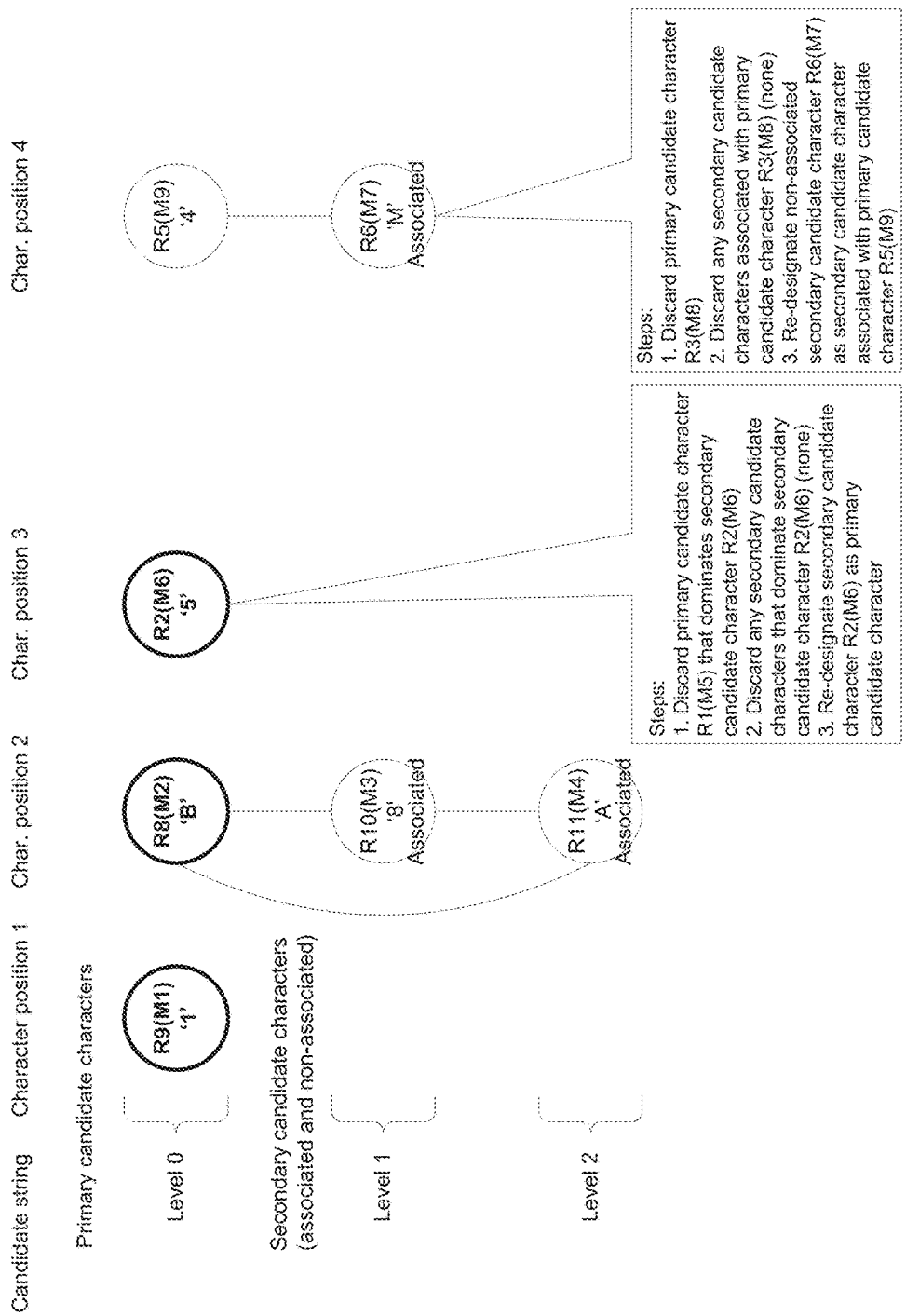
Figure 22:
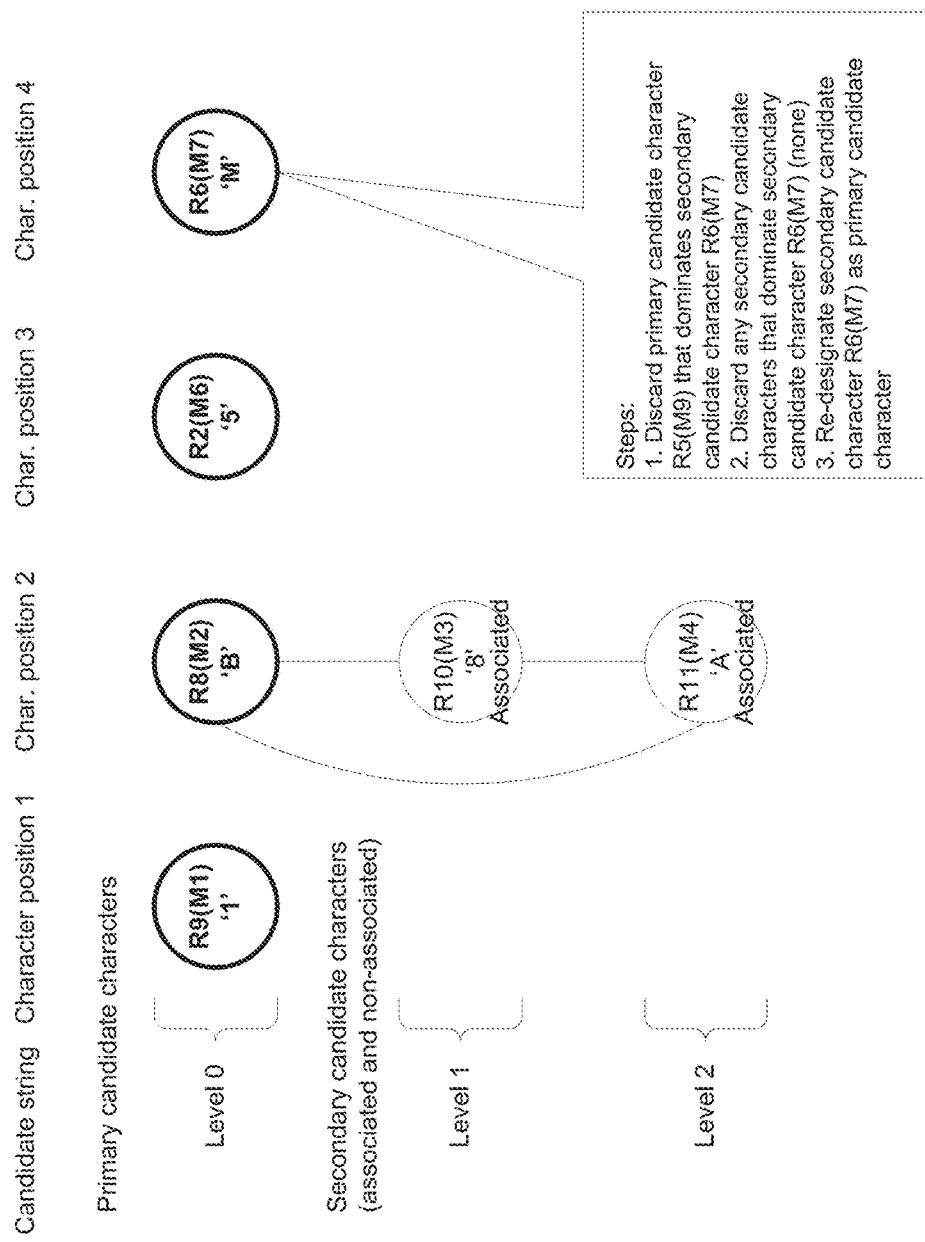

To illustrate the determination at step 240 of a minimum edit cost to transform a candidate string to satisfy a template of an output string, FIGS. 18-22 continue the example of target image 500 and its identified candidate string shown in FIGS. 14-15. More specifically, FIGS. 18-19 and 21 illustrate a DPA array used in determining a minimum edit cost of performing edit operations on the candidate string of FIGS. 14-15, to satisfy a template of an output string of fixed length, according to a non-limiting example of implementation of the present invention. FIGS. 20 and 22 illustrate manipulations of the candidate string of FIGS. 14-15 on a basis of the edit operations identified by the dynamic programming algorithm during the determination of the minimum edit cost.

Assume for the sake of this example that the allowable edit operations for transforming the candidate string to satisfy the template are a Delete (with cost $w_{del}(Mk)=Sk$) and a Keep-or-Replace (with cost $w_{keep}(Mk)=1-Sk$).

With reference to FIG. 18, the candidate string identified during the analysis of target image 500 has five character positions, each associated with a respective set of candidate characters including a primary candidate character and, in some cases, one or more associated (or exclusive) secondary candidate characters. Character positions 1, 4 and 5 are associated with sets of candidate characters including a single primary candidate character M1, M8 and M9, respectively. Character position 2 is associated with a set of candidate characters including both a primary candidate character M2 and two associated secondary candidate characters M3 and M4. Character position 3 is associated with a set of candidate characters including both a primary candidate character M5 and an associated secondary candidate character M6. Thus, each of character positions 2 and 3 of the candidate string is associated with a plurality of candidate characters.

As also seen in FIG. 18, the template has four output character positions and defines a respective character set for each of these output character positions, according to this non-limiting example.

FIG. 18 shows the edit cost D(i,j) determined at a number of cells (i, j) of the DPA array including the cells (1,1), (2,2) and (3,3).

To determine the edit cost at cell (1,1), the method considers the set of candidate characters at character position 1 (which includes a single primary candidate character M1 of label '1') and the character set at output character position 1 (which includes the single character '1'). Since the label '1' for primary candidate character M1 belongs to the character set, a keep operation is possible at cell (1, 1) and has a cost of $w_{keep}$ (M1)=1−S1=1−0.88=0.12. Since no other edit operation is possible at cell (1, 1), the method keeps primary candidate character M1 ('1') at cell (1,1) and the resulting edit cost D(1,1) is 0.12.

To determine the edit cost at cell (2,2), the method considers the set of candidate characters at character position 2 (which includes a primary candidate character M2 of label 'B' and two associated secondary candidate characters M3 of label '8' and M4 of label 'A') and the character set at output character position 2 (which includes the characters 'A' and 'B'). Since the primary candidate character M2 ('B') belongs to the character set, a keep operation is possible at cell (2, 2) and the cost is $w_{keep}$ (M2)=1−S2=1−0.91=0.09. Note that the associated secondary candidate character M4 ('A') also belongs to the character set, but has a lower score S4=0.75 which would result in a higher cost $w_{keep}$(M4)=1−S4=1−0.75=0.25 for the keep operation. Since no other edit operation is possible at cell (2,2), the method keeps primary candidate character M2 ('B') at cell (2,2) and the resulting edit cost D(2,2) is calculated as D(1,1)+$w_{keep}$(M2)=0.12+0.09=0.21.

FIG. 18 shows the edit cost D(i,j) determined at cell (i, j)=(3, 3), following the earlier determined edit operations of Keep M1 (at cell (1,1)) and Keep M2 (at cell (2,2)). To determine the edit cost at cell (3,3), the method considers the set of candidate characters at character position 3 (which includes a primary candidate character M5 of label 'S' and associated secondary candidate character M6 of label '5') and the character set at output character position 3 (which includes the characters 0-9). The primary candidate character M5 does not belong to the character set but the secondary candidate character M6 does. Therefore, it is possible to perform a keep operation by replacing the primary candidate character M5 by the secondary candidate character M6 (or in other words, by keeping the secondary candidate character M6) and the cost of the keep operation is $w_{keep}$(M6)=1−S6=(1−0.97)=0.03. Since no other edit operation is possible at cell (3,3), the method keeps secondary candidate character M6 ('5') at cell (3,3) and the resulting edit cost D(3,3) is calculated as D(2,2)+$w_{keep}$(M6)=0.21+0.03=0.24. As a result, the method also discards primary candidate character M5 from the candidate string and re-designates secondary candidate character M6 as the primary candidate character for character position 3 of the candidate string (as shown in FIGS. 19 and 20).

FIG. 19 shows the edit cost D(i,j) determined at cell (4,3), following the earlier determined edit operations of Keep M1 (at cell (1,1)), Keep M2 (at cell (2,2)) and Keep M6 (at cell (3,3)). To determine the edit cost at cell (4,3), the method compares two options, namely proceeding diagonally from cell (3,2) and performing a keep operation or proceeding downwards from cell (3,3) and performing a delete operation. The set of candidate characters at character position 4 includes a single primary candidate character M8 of label '1' and the character set at output character position 3 includes the characters 0-9. Since the primary candidate character M8 ('1') belongs to the character set, a keep operation is possible at cell (4, 3) and the cost is $w_{keep}$(M8)=1−S8=1−0.96=0.04; the resulting edit cost for cell (4,3) when proceeding diagonally from cell (3,2) and performing a keep operation is D(3,2)+$w_{keep}$(M8)=1.19+0.04=1.23. At cell (4, 3), it also possible to proceed downward from cell (3,3) and perform a delete operation. The resulting edit cost would be D(3,3)+$w_{del}$(M8)=D(3,3)+S8=0.24+0.96=1.20. Since the delete operation results in a lower edit cost, the method deletes primary candidate character M8 ('1') and the resulting edit cost D(4,3) is 1.20.

The edit operations shown in FIGS. 18 and 19 are illustrated in FIG. 20 as manipulations on the candidate string itself. We see that M5 has been discarded in favour of M6 at character position 3, M6 now re-designated as a primary candidate character of dominance level 0. We also see that primary candidate character M8 has been discarded and that primary candidate character M9 has been associated with character position 4, instead of character position 5.

Note that, in the specific, non-limiting example shown in FIGS. 20 and 21, when primary candidate character M8 is discarded, the non-associated secondary candidate character M7 (that was originally found to be non-associated because it was not exclusive to either M8 or M9) is re-designated as an associated secondary candidate character of primary candidate character M9. Such a step in the transformation of the candidate string is possible if any non-associated candidate characters are returned with the candidate string at step 360, for example.

FIG. 21 shows the edit cost D(i,j) determined at cell (5,4), following the earlier determined edit operations of Keep M1 (at cell (1,1)), Keep M2 (at cell (2,2)), Keep M6 (at cell (3,3)) and Delete M8 (at cell (4,3)). To determine the edit cost at cell (5,4), the method considers the set of candidate characters at character position 5 (which includes a primary candidate character M9 of label '4' and newly associated secondary candidate character M7 of label 'M') and the character set at output character position 4 (which includes the characters A-Z). The primary candidate character M9 does not belong to the character set but the secondary candidate character M7 does. Therefore, it is possible to perform a keep operation by replacing the primary candidate character M9 by the secondary candidate character M7 (or in other words, by keeping the secondary candidate character M7) and the cost of the keep operation is $w_{keep}(M7)=1-S7=(1-0.92)=0.08$. Since no other edit operation is possible at cell (5,4), the method keeps secondary candidate character M7 ('M') at cell (5,4) and the resulting edit cost D(5,4) is calculated as $D(4,3)+w_{keep}(M7)=1.20+0.08=1.28$.

The edit operations shown in FIG. 21 are illustrated in FIG. 22 as manipulations on the candidate string itself, such that we see that primary candidate character M9 has been discarded in favour of secondary candidate character M7 at character position 4, M7 now re-designated as a primary candidate character of dominance level 0.

Thus, the minimum cost of the edit operations to transform the candidate string of target image 500 to satisfy the template output string is determined by the dynamic programming algorithm to be 1.28, in this particular non-limiting example of implementation of the present invention.

As described earlier, in some embodiments, a template for an output string can be of variable length. In such embodiments, a template may have a minimum length Lmin and a maximum length Lmax, and a character set Cj is defined for each output character position j in the range [1, Lmax].

In some embodiments, the minimum edit cost between a candidate string and a template of variable length can be determined using an extension or generalization of a method of determining a minimum edit cost for a template of fixed length. For example, the minimum edit cost for a template of variable length can be determined by generalizing the method of determining a minimum edit cost using a dynamic programming algorithm and DPA array described earlier with respect to FIGS. 16 and 17A.

FIG. 17B illustrates a DPA array for a template of variable length, according to an embodiment of the present invention. The template has output character positions j=1 to Lmax and corresponding character sets C1 to CLmax, respectively. The minimum edit cost for a template of variable length can be determined in two parts.

First, a minimum edit cost D(N, Lmax) is determined between the candidate string and a template of length Lmax, according to the method outlined in FIG. 16 where M=Lmax. That is, each cell (i,j) of the DPA array is processed in turn, proceeding generally from the top-left cell (0,0) to the bottom-right cell (N, Lmax) (at step 1000). For a given cell (i,j) corresponding to character position i and set of candidate characters CCi of the candidate string and output character position j and character set Cj of the template, the minimum edit cost D(i,j) is determined according to steps 1010-1060 of FIG. 16.

The minimum edit costs D(N, Lmin) to D(N, Lmax) correspond to the minimum edit costs for different "versions" of the template. Then, an overall minimum edit cost is determined for the template of variable length by selecting the minimum cost among the minimum edit costs D(N, Lmin) to D(N, Lmax).

Returning to FIG. 2, once the string recognition process has determined a minimum edit cost of transforming the candidate string to satisfy a template of an output string at step 240, an output string corresponding to the determined minimum edit cost is returned at step 250. In some embodiments, this is performed by determining a set of edit operations corresponding to the minimum edit cost, performing the set of edit operations (if any) on the candidate string to obtain a revised candidate string, and returning an output string corresponding to the revised candidate string. In some embodiments, the output string includes for each output character position j a reference to a respective primary candidate character Mj of the revised candidate string and, optionally, related information such as the character model CMj that was matched and its label Lj, a position Xj of the match in the target image, and the recognition score Sj. In other embodiments, the output string includes for each output character position the label Lj of the model character that was matched.

In a preferred embodiment, the determination of a set of edit operations corresponding to the minimum edit cost comprises backtracking through a DPA array, as known from existing string recognition systems. However, any suitable method may be used to determine the set of edit operations corresponding to the minimum edit distance between the candidate string and the template, without departing from the scope of the present invention.

In the example of FIGS. 18-19 and 21, backtracking through the DPA array is reflected in the manipulations shown in FIGS. 20 and 22, which in fact correspond to the set of edit operations that correspond to the determined minimum edit cost of 1.28. The result of performing this set of edit operations on the candidate string is also shown in FIGS. 20 and 22.

To conclude this example, FIG. 23 illustrates the output string returned by the transformation of the candidate string to satisfy the defined template, on a basis of the particular set of edit operations identified as corresponding to the minimum edit distance between the candidate string and the template, in accordance with this non-limiting example of implementation of the present invention. In this example, the output string includes for each output character position a character (label) that belongs to the respective character set of the template.

Note that, it is always possible that, when determining a minimum edit distance between the candidate string and the template, only Keep operations are defined and the output string returned by the string recognition process at step 250 corresponds to the original candidate string, rather to an edited version of the candidate string.

Multiple Candidate Strings, Single Output String, Single Template

Returning to FIG. 2, in some embodiments, multiple candidate strings can be identified in the target image (at step 230). For example, this can result from multiple sequences of sets of candidate characters satisfying a stringness criteria being identified and returned (at steps 350 and 360). In such embodiments, the method of recognizing a string of characters in a target image (described with respect to FIG. 2) may be extended to support multiple candidate strings, for example according to the following steps.

The multiple candidate strings can be denoted CS1 to CSN where N is the number of candidate strings identified in the target image (at step 230). First, for each candidate string CSi, the minimum edit cost Di between the candidate string CSi and the template is determined. Then, the candidate string CSmin corresponding to the lowest minimum edit cost Dmin among the minimum edit costs Di is selected. Finally, an output string corresponding to the minimum edit cost Dmin of the selected candidate string CSmin is returned (at step 250).

Single Candidate String, Single Output String, Multiple Templates

Returning to FIG. 2, in some embodiments, multiple templates for a single output string may be defined (at step 210), for example, if the output string can satisfy one of many different formats. In such embodiments, the method of recognizing a string of characters in a target image (described with respect to FIG. 2) may be extended to support multiple templates for an output string, for example according to the following steps.

The templates can be denoted T1 to TM where M is the number of templates defined at step 210. Each template Tj has a length (number of output character positions) Lj. In one embodiment, for each template Tj, the minimum edit cost Dj between the candidate string CS and the template Tj is determined and divided by the length Lj to obtain a normalized minimum edit cost Dj_norm. In another embodiment, the normalized minimum edit cost Dj_norm is obtained by dividing the minimum edit cost Dj by the number of edit operations associated with the determined minimum edit cost Dj. For example, if the allowable edit operations consist of a delete operation and a keep operation, then the number of edit operations can be calculated as the total number of operations including both keep and delete operations determined during calculation of the minimum edit cost. Then, the template Tmin corresponding to the lowest normalized minimum edit cost Dmin among the normalized minimum edit costs Dj_norm is selected. Finally, an output string corresponding to the minimum edit cost Dmin of the selected template Tmin is returned (at step 250).

Multiple Candidate Strings, Single Output String, Multiple Templates

In some embodiments, multiple candidate strings can be identified in the target image (at step 230) and multiple templates for a single output string can be defined (at step 210).

In such embodiments, the method of recognizing a string of characters in a target image (described with respect to FIG. 2) may be extended to support both multiple candidate strings and multiple templates, for example according to the following steps.

For each candidate string-template pair (CSi, Tj), a normalized minimum edit cost Dij_norm is determined, normalized according to the length Lj of the template Tj or normalized according to the number of edit operations associated with the respective minimum edit cost Dij. Then, the candidate string-template pair (CS, T)min corresponding to the lowest normalized minimum edit cost Dmin among the normalized minimum edit costs Dij_norm is selected. Finally, an output string corresponding to the minimum edit cost Dmin of the selected candidate string-template pair (CS, T)min is returned (at step 250).

Multiple Candidate Strings, Multiple Output Strings, Single or Multiple Templates In some embodiments, the method of recognizing a string of characters in a target image and returning an output string (described with respect to FIG. 2) may be extended to recognize multiple strings of characters in the target image and returning multiple output strings, for example according to the following steps.

The output strings can be denoted OS1 to OSP where P is the number of output strings (defined at step 210). For each output string OSk, a single template Tk is defined (as in the description below, for simplicity) or multiple templates Tjk are defined. Generally, a "best pairing" between the set of output strings OSk and candidate strings CSi identified in the target image is determined, while verifying that there is no overlap between the selected candidate strings CSi in the target image (for example, two output strings cannot be paired with the same candidate string). The best pairing is determined based on the normalized minimum edit costs Dik_norm calculated between the respective templates Tk and candidate strings CSi.

FIG. 24 illustrates a block diagram of an image processing system for capturing images and analyzing these images to recognize strings of characters therein using an optical character recognition process, according to a broad embodiment of the present invention. A computer readable medium 1702, which may be non-transitory tangible media or a transitory propagating signal, is encoded with instructions that, when executed by a processor 1704, implement at least one of the aforementioned methods for recognizing and correcting a candidate string read from an image. In one example, the computer readable medium 1702 is encoded with instructions which, when executed by a processing unit 1704, implement a method for analyzing a target image to identify a candidate string therein, and for determining a minimum edit cost between this candidate string and a template for an output string.

FIG. 25 illustrates an exemplary image processing system (or machine vision system) in which the present invention may be employed. The image processing system includes a camera for acquiring an image of an object on which text appears and an image processor including a character string recognizer module (shown collectively as character string recognizer) for analyzing the acquired image. The character string recognizer is adapted to acquire a target image from a camera, as well as a template for an output string, and is operative to process the target image to identify therein a candidate string, in accordance with at least one of the aforementioned methods for recognizing a candidate string. In a specific non-limiting example of implementation, the character string recognizer implements an optical character recognition algorithm to identify in the target image a candidate string formed of sets of one or more candidate characters located at related positions in the target image. The character string recognizer transforms this candidate string into an output string satisfying the template on a basis of a minimum edit cost between the candidate string and the template. Thus, for a given character position in the candidate string and a given output character position in the template, the character string recognizer identifies, among the respective set of candidate characters of the candidate string, a subset of candidate characters that satisfy the respective character set of the template; and determines an edit cost based on a recognition score of one of the candidate characters belonging to the identified subset of candidate characters. The character string recognizer generates an output string corresponding to a determined minimum edit cost.

The various components and modules of the systems discussed hereinabove may all be implemented in software, hardware, firmware or any combination thereof, within one piece of equipment or split up among various different pieces of equipment. Obviously, various different software, hardware and/or firmware based implementations of the techniques of the present invention are possible and included within the scope of the present invention.

Architecture

Figure 26:
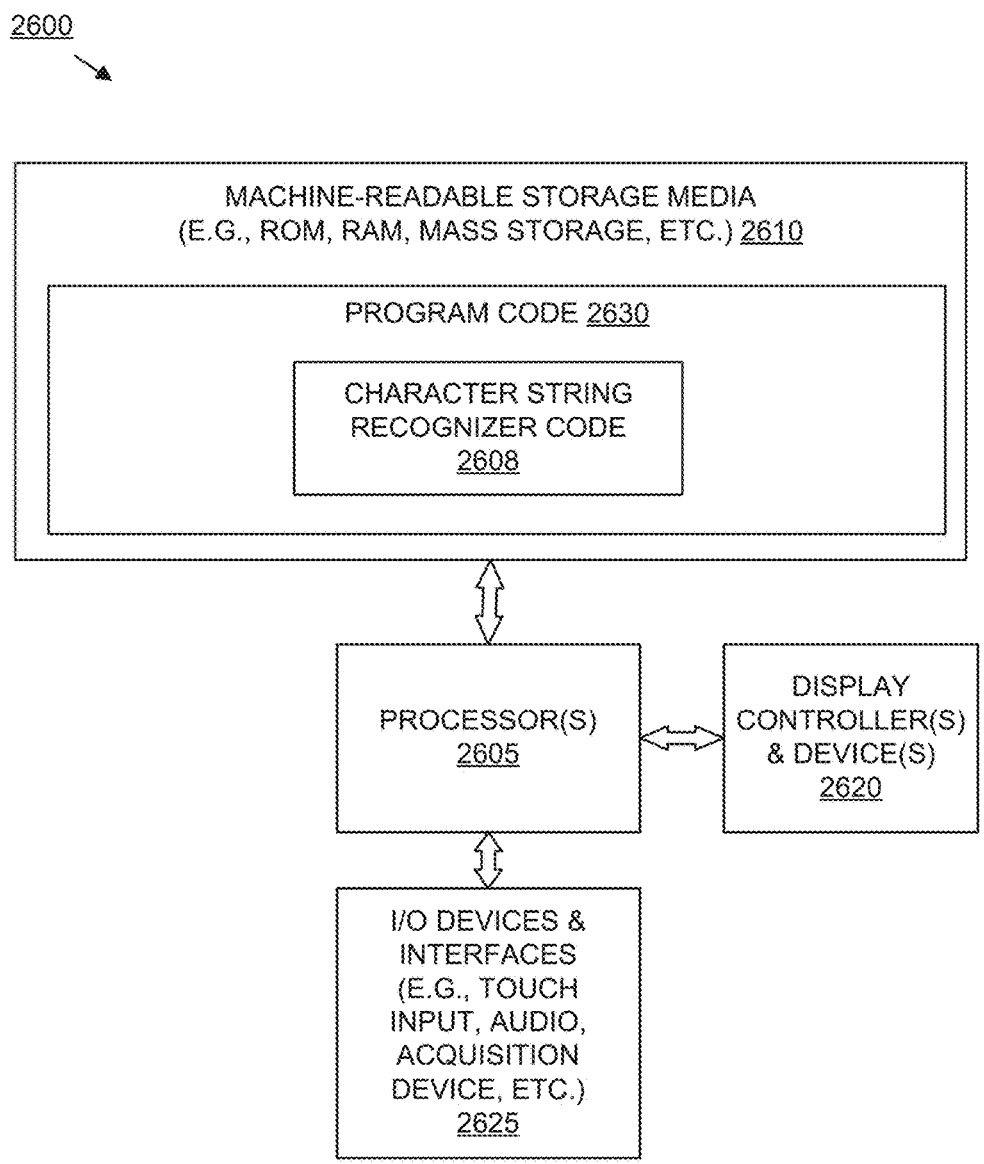
FIG. 26 is a block diagram of an exemplary data processing system that may be used in a broad embodiment of the present invention.

FIG. 26 illustrates a block diagram for an exemplary data processing system 2600 that may be used in some embodiments. Data processing system 2600 includes one or more processors 2605 and connected system components (e.g., multiple connected chips). Alternatively, the data processing system 2600 is a system on a chip or Field-Programmable gate array. One or more such data processing systems 2600 may be utilized to implement the functionality of the character string recognizer as illustrated in FIGS. 1-25.

The data processing system 2600 is an electronic device which stores and transmits (internally and/or with other electronic devices over a network) code (which is composed of software instructions and which is sometimes referred to as computer program code or a computer program) and/or data using machine-readable media (also called computer-readable media), such as machine-readable storage media 2610 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processor(s) 2605. For example, the depicted machine readable storage media 2610 may store program code 2630 that, when executed by the processor(s) 2605, causes the data processing system 2600 to perform efficient and accurate recognition of strings in an image. For example, the program code 2630 may include character string recognizer code 2608, which when executed by the processor(s) 2605, causes the data processing system 2600 to perform the operations described with reference to FIGS. 1-25.

Thus, an electronic device (e.g., a computer or an FPGA) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The data processing system 2600 may also include a display controller and display device 2620 to provide a visual user interface for the user, e.g., GUI elements or windows. The visual user interface may be used to enable a user to input parameters to the character string recognizer, to view results of the character string recognition (such as the output string), or any other task.

The data processing system 2600 also includes one or more input or output ("I/O") devices and interfaces 2625, which are provided to allow a user to provide input to, receive output from, and otherwise transfer data to and from the system. These I/O devices 2625 may include a mouse, keypad, keyboard, a touch panel or a multi-touch input panel, camera, frame grabber, optical scanner, an audio input/output subsystem (which may include a microphone and/or a speaker for, for example, playing back music or other audio, receiving voice instructions to be executed by the processor(s) 2605, playing audio notifications, etc.), other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 2600.

The I/O devices and interfaces 2625 may also include a connector for a dock or a connector for a USB interface, FireWire, Thunderbolt, Ethernet, etc., to connect the system 2600 with another device, external component, or a network. Exemplary I/O devices and interfaces 2625 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 2600 with another device, external component, or a network and receive stored instructions, data, tokens, etc. It will be appreciated that one or more buses may be used to interconnect the various components shown in FIG. 26.

It will be appreciated that additional components, not shown, may also be part of the system 2600, and, in certain embodiments, fewer components than that shown in FIG. 26 may also be used in a data processing system 2600. For example, in some embodiments the data processing system 2600 may include or be coupled with an image acquisition device (such as a digital camera) for acquiring images.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense. For example, while the flow diagrams in the figures show a particular order of operations performed by certain embodiments of the invention, it should be understood that such order is exemplary. One having ordinary skill in the art would recognize that variations can be made to the flow diagrams without departing from the broader spirit and scope of the invention as set forth in the following claims (e.g., alternative embodiments may perform the operations in a different order, combine certain operations, overlap certain operations, etc.).

Some portions of the preceding detailed descriptions have been presented in terms of algorithms and symbolic representations of transactions on data bits within a computer and memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

The claimed invention provides improvements to previous optical character recognition (OCR) technology. In particular, the claimed invention can be used to recognize a string of characters in a target image and return a correct output string for certain target images in which it would not be possible to correctly recognize the string using prior OCR technology. As a result, the claimed invention allows the reading of text in an image to be performed by a computer or other processor using OCR in cases that previously could not be performed by a computer or processor.

In existing OCR technology, only limited information related to the OCR process is considered during the OCR post-processing stage. In particular, during the OCR process, many potential matches for model characters may have been identified in a particular region of the input image and recognition scores attributed to each potential match. However, only information relating to the selected match (e.g., the potential match having the highest recognition score) is considered during the OCR post-processing stage in determining the minimum edit cost. This limits the ability of such OCR technology to correctly recognize a string of characters in a target image and return a correct output string.

More precisely, prior OCR technology for recognizing a string to satisfy a template has the following limitations, which can cause it to incorrectly recognize strings in certain images:

Firstly, for each character position, only the information (e.g., label and recognition score) relating to the single selected match from the OCR process is considered during calculation of the minimum edit cost between the string and the template.

Further, during calculation of the minimum edit cost between the string and the template, the cost of substituting a particular character (e.g, the label "8") of the string by a character set (e.g., the set of labels "A"-"Z") of the template is determined by considering, in turn, each character of the character set and a corresponding similarity score between the model character of the respective character of the character set (e.g, the model character for label "A", "B", etc.) and the model character of the particular character of the string (e.g., the model character for the label "8"). It does this without considering whether the characters of the character set were in fact identified in the target image and, if so, without considering their respective recognition scores. As a result, the determined minimum edit cost used to select a set of edit operations to perform on the string to satisfy the template (and to select a template in the case of multiple templates) in some cases does not accurately reflect information contained in the target image.

In contrast, the claimed method overcomes these limitations by determining the minimum edit cost between a candidate string and a template by considering, for each character position in the candidate string, a set of candidate characters that were actually matched in the target image and their respective recognition scores. When multiple candidate characters are identified at related positions in the target image, the claimed method considers the multiple candidate characters and their recognition scores when determining the minimum edit cost. As a result, the claimed invention provides an accurate selection of candidate characters (and thus labels) to satisfy a particular template based on the determined minimum edit cost. In the case of multiple templates, the claimed invention provides an accurate pairing between candidate strings and templates based on the determined minimum edit cost. As a result, the claimed method allows the automated recognition of text using OCR in certain cases where existing automated methods would fail.

Although various embodiments have been illustrated, this was for the purpose of describing, but not limiting, the present invention. Various possible modifications and different configurations will become apparent to those skilled in the art and are within the scope of the present invention, which is defined more particularly by the attached claims.

What is claimed is:

1. A method of recognizing a string of characters in a target image, said method comprising:
    a. acquiring a target image;
    b. analyzing the target image using an optical character recognition process to identify a candidate string, the candidate string having an associated plurality of character positions, each character position being associated with a set of one or more candidate characters located at related positions in the target image, at least one of the character positions being associated with a plurality of candidate characters, each candidate character having an associated recognition score;

c. receiving a template for an output string, the template having an associated plurality of output character positions, each output character position being associated with a character set defining a set of allowable characters for a respective character position in the output string;

d. determining a minimum edit cost between the candidate string and the template, said determining a minimum edit cost including, for a given character position in the candidate string and a given output character position in the template:
  i. identifying, among the respective set of candidate characters of the candidate string, a subset of candidate characters that satisfy the respective character set of the template; and
  ii. determining an edit cost based on the recognition score of one of the candidate characters belonging to the identified subset of candidate characters; and e. returning an output string corresponding to the determined minimum edit cost.

2. A method as defined in claim 1, further comprising acquiring a set of character models, the step of analyzing the target image to identify a candidate string including:
  a. identifying candidate characters in the target image for each character model using an OCR process, each candidate character having an associated position in the target image and a recognition score;
  b. finding sets of candidate characters located at related positions within the target image;
  c. identifying a sequence of sets of candidate characters in the target image that satisfy a stringness criteria; and
  d. returning the sequence of sets of candidate characters as the candidate string.

3. A method as defined in claim 2, wherein finding sets of candidate characters located at related positions within the target image includes determining if the associated positions of two or more candidate characters overlap within the target image.

4. A method as defined in claim 3, wherein finding sets of candidate characters located at related positions within the target image includes
  a. ranking identified candidate characters on a basis of their respective recognition scores;
  b. relating by level of dominance the ranked candidate characters on a basis of the relative positioning of the candidate characters within the target image;
  c. forming hierarchical sets of candidate characters located at related positions within the target image.

5. A method as defined in claim 4, wherein forming a hierarchical set of candidate characters located at related positions within the target image includes designating as a primary candidate character the candidate character having the highest recognition score among the set, and designating as secondary candidate characters the one or more candidate characters of the set having lower recognition scores, if any.

6. A method as defined in claim 5, wherein forming a hierarchical set of candidate characters located at related positions within the target image further includes designating each secondary candidate character of a particular hierarchical set as being either associated or non-associated with the respective primary candidate character of the particular hierarchical set, on a basis of a relative positioning of the candidate characters identified within the target image.

7. A method as defined in claim 5, wherein identifying a sequence of sets of candidate characters in the target image that satisfy a stringness criteria includes determining if the primary candidate characters of the sequence of sets of candidate characters together satisfy the stringness criteria.

8. A method as defined in claim 5, wherein returning the sequence of sets of candidate characters as the candidate string includes returning, for each character position in the candidate string, a primary candidate character and any associated secondary candidate characters.

9. A method as defined in claim 8, wherein returning the sequence of sets of candidate characters as the candidate string further includes returning, for each character position in the candidate string, any non-associated secondary candidate characters identified for the respective primary candidate character.

10. A method as defined in claim 1, wherein determining an edit cost for a given character position in the candidate string and a given output character position in the template is dependent on a type of edit operation to be performed.

11. A method as defined in claim 10, wherein, for at least one type of edit operation, said determining an edit cost at the given character position in the candidate string includes determining which particular candidate character of the respective subset of candidate characters is to undergo the edit operation.

12. A method as defined in claim 8, wherein, for at least one type of edit operation, if, for the given character position in the candidate string and the given output character position in the template, the primary candidate character of the respective set of candidate characters satisfies the respective character set of the template but the associated secondary candidate character does not, said determining a edit cost at the given character position in the candidate string is based on the recognition score of the respective primary candidate character.

13. A method as defined in claim 8, wherein, for at least one type of edit operation, if, for the given character position in the candidate string and the given output character position in the template, the primary candidate character of the respective set of candidate characters does not satisfy the respective character set of the template but the associated secondary candidate character does, said determining an edit cost at the given character position in the candidate string is based on the recognition score of the associated secondary candidate character.

14. A method as defined in claim 8, wherein, for at least one type of edit operation, if, for the given character position in the candidate string and the given output character position in the template, both the primary candidate character and its associated secondary candidate character of the respective set of candidate characters satisfy the respective character set of the template, said determining an edit cost at the given character position in the candidate string is based on the greater of the recognition score of the primary candidate character and the recognition score of the associated secondary candidate character.

15. A method as defined in claim 5, further comprising determining a set of edit operations corresponding to the determined minimum edit cost between the candidate string and the template in terms of primary candidate characters of the candidate string, secondary candidate characters associated with the primary candidate characters and character sets of the template.

16. A method as defined in claim 1, wherein said step of determining a minimum edit cost between the candidate string and the template is performed according to a dynamic programming algorithm.

17. A method as defined in claim 10, wherein determining a minimum edit cost between the candidate string and a template includes defining a set of allowable edit operations that can be performed on the candidate string and determining a cost equation associated with each allowable edit operation.

18. A method as defined in claim 17, wherein the set of allowable edit operations includes a delete operation and a keep operation.

19. A method of processing a candidate string, said method comprising:
   a. receiving a candidate string generated by an optical character recognition process, the candidate string having an associated plurality of character positions, each character position being associated with a set of one or more candidate characters located at related positions in the target image, at least one of the character positions being associated with a plurality of candidate characters, each candidate character having an associated recognition score;
   b. receiving a template for an output string, the template having an associated plurality of output character positions, each output character position being associated with a character set defining a set of allowable characters for a respective character position in the output string;
   c. determining a minimum edit cost between the candidate string and the template, said determining a minimum edit cost including, for a given character position in the candidate string and a given output character position in the template:
      i. identifying, among the respective set of candidate characters of the candidate string, a subset of candidate characters that satisfy the respective character set of the template; and
      ii. determining an edit cost based on the recognition score of one of the candidate characters belonging to the identified subset of candidate characters; and
   d. returning an output string corresponding to the determined minimum edit cost.

20. A non-transitory computer readable medium encoded with instructions that when executed by at least one processor implement a method for recognizing a string of characters in a target image, said method comprising:
   a. acquiring a target image;
   b. analyzing the target image using an optical character recognition process to identify a candidate string, the candidate string having an associated plurality of character positions, each character position being associated with a set of one or more candidate characters located at related positions in the target image, at least one of the character positions being associated with a plurality of candidate characters, each candidate character having an associated recognition score;
   c. receiving a template for an output string, the template having an associated plurality of output character positions, each output character position being associated with a character set defining a set of allowable characters for a respective character position in the output string;
   d. determining a minimum edit cost between the candidate string and the template, said determining a minimum edit cost including, for a given character position in the candidate string and a given output character position in the template:
      i. identifying, among the respective set of candidate characters of the candidate string, a subset of candidate characters that satisfy the respective character set of the template; and
      ii. determining an edit cost based on the recognition score of one of the candidate characters belonging to the identified subset of candidate characters; and;
   e. returning an output string corresponding to the determined minimum edit cost.

21. An image processing system for recognizing a string of characters in a target image, said image processing system comprising:
   a. a camera for acquiring a target image; and
   b. an image circuit for:
      i. analyzing the target image using an optical character recognition process to identify a candidate string, the candidate string having an associated plurality of character positions, each character position being associated with a set of one or more candidate characters located at related positions in the target image, at least one of the character positions being associated with a plurality of candidate characters, each candidate character having an associated recognition score;
      ii. receiving a template for an output string, the template having an associated plurality of output character positions, each output character position being associated with a character set defining a set of allowable characters for a respective character position in the output string;
      iii. determining a minimum edit cost between the candidate string and the template, said determining a minimum edit cost including, for a given character position in the candidate string and a given output character position in the template:
         1. identifying, among the respective set of candidate characters of the candidate string, a subset of candidate characters that satisfy the respective character set of the template; and
         2. determining an edit cost based on the recognition score of one of the candidate characters belonging to the identified subset of candidate characters; and
      iv. returning an output string corresponding to the determined minimum edit cost.

22. A non-transitory computer readable medium as defined in claim 20, wherein the method further comprises acquiring a set of character models, the step of analyzing the target image to identify a candidate string including:
   a. identifying candidate characters in the target image for each character model using an OCR process, each candidate character having an associated position in the target image and a recognition score;
   b. finding sets of candidate characters located at related positions within the target image;
   c. identifying a sequence of sets of candidate characters in the target image that satisfy a stringness criteria; and
   d. returning the sequence of sets of candidate characters as the candidate string.

23. A non-transitory computer readable medium as defined in claim 22, wherein finding sets of candidate characters located at related positions within the target image includes determining if the associated positions of two or more candidate characters overlap within the target image.

24. A non-transitory computer readable medium as defined in claim 23, wherein finding sets of candidate characters located at related positions within the target image includes
   a. ranking identified candidate characters on a basis of their respective recognition scores;

b. relating by level of dominance the ranked candidate characters on a basis of the relative positioning of the candidate characters within the target image;

c. forming hierarchical sets of candidate characters located at related positions within the target image.

25. A non-transitory computer readable medium as defined in claim 24, wherein forming a hierarchical set of candidate characters located at related positions within the target image includes designating as a primary candidate character the candidate character having the highest recognition score among the set, and designating as secondary candidate characters the one or more candidate characters of the set having lower recognition scores, if any.

26. A non-transitory computer readable medium as defined in claim 25, wherein forming a hierarchical set of candidate characters located at related positions within the target image further includes designating each secondary candidate character of a particular hierarchical set as being either associated or non-associated with the respective primary candidate character of the particular hierarchical set, on a basis of a relative positioning of the candidate characters identified within the target image.

27. A non-transitory computer readable medium as defined in claim 25, wherein identifying a sequence of sets of candidate characters in the target image that satisfy a stringness criteria includes determining if the primary candidate characters of the sequence of sets of candidate characters together satisfy the stringness criteria.

28. A non-transitory computer readable medium as defined in claim 25, wherein returning the sequence of sets of candidate characters as the candidate string includes returning, for each character position in the candidate string, a primary candidate character and any associated secondary candidate characters.

29. A non-transitory computer readable medium as defined in claim 28, wherein returning the sequence of sets of candidate characters as the candidate string further includes returning, for each character position in the candidate string, any non-associated secondary candidate characters identified for the respective primary candidate character.

30. A non-transitory computer readable medium as defined in claim 20, wherein determining an edit cost for a given character position in the candidate string and a given output character position in the template is dependent on a type of edit operation to be performed.

31. A non-transitory computer readable medium as defined in claim 30, wherein, for at least one type of edit operation, said determining an edit cost at the given character position in the candidate string includes determining which particular candidate character of the respective subset of candidate characters is to undergo the edit operation.

32. A non-transitory computer readable medium as defined in claim 28, wherein, for at least one type of edit operation, if, for the given character position in the candidate string and the given output character position in the template, the primary candidate character of the respective set of candidate characters satisfies the respective character set of the template but the associated secondary candidate character does not, said determining a edit cost at the given character position in the candidate string is based on the recognition score of the respective primary candidate character.

33. A non-transitory computer readable medium as defined in claim 28, wherein, for at least one type of edit operation, if, for the given character position in the candidate string and the given output character position in the template, the primary candidate character of the respective set of candidate characters does not satisfy the respective character set of the template but the associated secondary candidate character does, said determining an edit cost at the given character position in the candidate string is based on the recognition score of the associated secondary candidate character.

34. A non-transitory computer readable medium as defined in claim 28, wherein, for at least one type of edit operation, if, for the given character position in the candidate string and the given output character position in the template, both the primary candidate character and its associated secondary candidate character of the respective set of candidate characters satisfy the respective character set of the template, said determining an edit cost at the given character position in the candidate string is based on the greater of the recognition score of the primary candidate character and the recognition score of the associated secondary candidate character.

35. A non-transitory computer readable medium as defined in claim 25, further comprising determining a set of edit operations corresponding to the determined minimum edit cost between the candidate string and the template in terms of primary candidate characters of the candidate string, secondary candidate characters associated with the primary candidate characters and character sets of the template.

36. A non-transitory computer readable medium as defined in claim 20, wherein said step of determining a minimum edit cost between the candidate string and the template is performed according to a dynamic programming algorithm.

37. A non-transitory computer readable medium as defined in claim 30, wherein determining a minimum edit cost between the candidate string and a template includes defining a set of allowable edit operations that can be performed on the candidate string and determining a cost equation associated with each allowable edit operation.

38. A non-transitory computer readable medium as defined in claim 37, wherein the set of allowable edit operations includes a delete operation and a keep operation.

39. An image processing system as defined in claim 21, wherein said image circuit acquires a set of character models and, when analyzing the target image to identify a candidate string, said image circuit is operative for:

a. identifying candidate characters in the target image for each character model using an OCR process, each candidate character having an associated position in the target image and a recognition score;

b. finding sets of candidate characters located at related positions within the target image;

c. identifying a sequence of sets of candidate characters in the target image that satisfy a stringness criteria; and d. returning the sequence of sets of candidate characters as the candidate string.

40. An image processing system as defined in claim 39, wherein finding sets of candidate characters located at related positions within the target image includes determining if the associated positions of two or more candidate characters overlap within the target image.

41. An image processing system as defined in claim 40, wherein finding sets of candidate characters located at related positions within the target image includes a. ranking identified candidate characters on a basis of their respective recognition scores;

b. relating by level of dominance the ranked candidate characters on a basis of the relative positioning of the candidate characters within the target image;

c. forming hierarchical sets of candidate characters located at related positions within the target image.

42. An image processing system as defined in claim 41, wherein forming a hierarchical set of candidate characters located at related positions within the target image includes designating as a primary candidate character the candidate character having the highest recognition score among the set, and designating as secondary candidate characters the one or more candidate characters of the set having lower recognition scores, if any.

43. An image processing system as defined in claim 42, wherein forming a hierarchical set of candidate characters located at related positions within the target image further includes designating each secondary candidate character of a particular hierarchical set as being either associated or non-associated with the respective primary candidate character of the particular hierarchical set, on a basis of a relative positioning of the candidate characters identified within the target image.

44. An image processing system as defined in claim 42, wherein identifying a sequence of sets of candidate characters in the target image that satisfy a stringness criteria includes determining if the primary candidate characters of the sequence of sets of candidate characters together satisfy the stringness criteria.

45. An image processing system as defined in claim 42, wherein returning the sequence of sets of candidate characters as the candidate string includes returning, for each character position in the candidate string, a primary candidate character and any associated secondary candidate characters.

46. An image processing system as defined in claim 45, wherein returning the sequence of sets of candidate characters as the candidate string further includes returning, for each character position in the candidate string, any non-associated secondary candidate characters identified for the respective primary candidate character.

47. An image processing system as defined in claim 21, wherein determining an edit cost for a given character position in the candidate string and a given output character position in the template is dependent on a type of edit operation to be performed.

48. An image processing system as defined in claim 47, wherein, for at least one type of edit operation, said determining an edit cost at the given character position in the candidate string includes determining which particular candidate character of the respective subset of candidate characters is to undergo the edit operation.

49. An image processing system as defined in claim 45, wherein, for at least one type of edit operation, if, for the given character position in the candidate string and the given output character position in the template, the primary candidate character of the respective set of candidate characters satisfies the respective character set of the template but the associated secondary candidate character does not, said determining a edit cost at the given character position in the candidate string is based on the recognition score of the respective primary candidate character.

50. An image processing system as defined in claim as defined in claim 45, wherein, for at least one type of edit operation, if, for the given character position in the candidate string and the given output character position in the template, the primary candidate character of the respective set of candidate characters does not satisfy the respective character set of the template but the associated secondary candidate character does, said determining an edit cost at the given character position in the candidate string is based on the recognition score of the associated secondary candidate character.

51. An image processing system as defined in claim 45, wherein, for at least one type of edit operation, if, for the given character position in the candidate string and the given output character position in the template, both the primary candidate character and its associated secondary candidate character of the respective set of candidate characters satisfy the respective character set of the template, said determining an edit cost at the given character position in the candidate string is based on the greater of the recognition score of the primary candidate character and the recognition score of the associated secondary candidate character.

52. An image processing system as defined in claim 42, where said image circuit is further operative for determining a set of edit operations corresponding to the determined minimum edit cost between the candidate string and the template in terms of primary candidate characters of the candidate string, secondary candidate characters associated with the primary candidate characters and character sets of the template.

53. An image processing system as defined in claim 21, wherein determining a minimum edit cost between the candidate string and the template is performed by said image circuit according to a dynamic programming algorithm.

54. An image processing system as defined in claim 47, wherein determining a minimum edit cost between the candidate string and a template includes defining a set of allowable edit operations that can be performed on the candidate string and determining a cost equation associated with each allowable edit operation.

55. An image processing system as defined in claim 54, wherein the set of allowable edit operations includes a delete operation and a keep operation.

* * * * *